United States Patent
Quin et al.

(10) Patent No.: US 10,572,248 B2
(45) Date of Patent: Feb. 25, 2020

(54) GROUPS OF ENDPOINTS AND TARGETING OF RELEASES AND PACKAGES TO ENDPOINTS

(71) Applicant: BLACKBERRY LIMITED, Waterloo (CA)

(72) Inventors: Spencer Leavitt George Quin, Kitchener (CA); Thomas Owen Parry, Cambridge (CA); Yuhui Liu, Waterloo (CA); Bradley Alfred Fach, Cambridge (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 14/824,979

(22) Filed: Aug. 12, 2015

(65) Prior Publication Data
US 2017/0046150 A1    Feb. 16, 2017

(51) Int. Cl.
G06F 9/44     (2018.01)
G06F 8/71     (2018.01)
G06F 8/654    (2018.01)
G06F 8/61     (2018.01)
G06F 8/60     (2018.01)

(52) U.S. Cl.
CPC .......... *G06F 8/71* (2013.01); *G06F 8/60* (2013.01); *G06F 8/61* (2013.01); *G06F 8/654* (2018.02)

(58) Field of Classification Search
None
See application file for complete search history.

(56) References Cited

U.S. PATENT DOCUMENTS

| | | | |
|---|---|---|---|
| 6,581,075 B1 | 6/2003 | Guturu et al. | |
| 6,999,477 B1 | 2/2006 | Oz et al. | |
| 8,521,846 B2 * | 8/2013 | Masters | G06F 8/71 709/219 |
| 8,600,895 B2 * | 12/2013 | Felsher | G06F 19/322 705/2 |
| 8,707,289 B2 * | 4/2014 | Firman | G06F 8/60 717/170 |

(Continued)

FOREIGN PATENT DOCUMENTS

| GB | 2386706 | 9/2003 |
|---|---|---|
| WO | 2011046560 | 4/2011 |

OTHER PUBLICATIONS

Matheson, International Search Report and Written Opinion for PCT/CA2016/050901, dated Oct. 7, 2016.

(Continued)

*Primary Examiner* — Qamrun Nahar
(74) *Attorney, Agent, or Firm* — Integral Intellectual Property Inc.; Miriam Paton; Amy Scouten

(57) ABSTRACT

Data structures are stored in an endpoint data store. Each data structure represents an endpoint having one or more components, each component having one or more arbitrary properties. Multiple groups of endpoints are identified by name and defined by group criteria expressed in terms of the one or more arbitrary properties of the one or more components of the endpoints that are members of the group. For each group, the group criteria of the group is stored in a data store in association with the name of the group. Packages and releases may be targeted to endpoints in various manners.

16 Claims, 8 Drawing Sheets

(56) References Cited

U.S. PATENT DOCUMENTS

| | | | |
|---|---|---|---|
| 8,813,063 B2 | 8/2014 | Uthe | |
| 9,047,133 B2* | 6/2015 | Winterfeldt | G06F 8/60 |
| 9,069,641 B2 | 6/2015 | Parry et al. | |
| 9,077,630 B2* | 7/2015 | Backholm | H04L 67/42 |
| 2002/0194108 A1 | 12/2002 | Kitze | |
| 2003/0149830 A1 | 8/2003 | Torr et al. | |
| 2004/0059780 A1* | 3/2004 | Giannetti | H04L 67/327 |
| | | | 709/203 |
| 2005/0091348 A1 | 4/2005 | Ferri et al. | |
| 2005/0125148 A1 | 6/2005 | Van Buer et al. | |
| 2005/0228863 A1 | 10/2005 | Palmeri et al. | |
| 2006/0130037 A1 | 6/2006 | Mackay | |
| 2006/0168268 A1 | 7/2006 | Barrett et al. | |
| 2007/0240151 A1* | 10/2007 | Marl | G06F 8/61 |
| | | | 717/174 |
| 2008/0288584 A1 | 11/2008 | Colantuono et al. | |
| 2012/0023236 A1* | 1/2012 | Backholm | H04L 47/20 |
| | | | 709/226 |
| 2012/0036504 A1* | 2/2012 | Masters | G06F 8/71 |
| | | | 717/171 |
| 2013/0024851 A1* | 1/2013 | Firman | G06F 8/60 |
| | | | 717/170 |
| 2013/0060924 A1 | 3/2013 | Zhang et al. | |
| 2013/0066942 A1 | 3/2013 | Massey et al. | |
| 2013/0097130 A1 | 4/2013 | Bingol et al. | |
| 2013/0159021 A1* | 6/2013 | Felsher | G06F 19/322 |
| | | | 705/3 |
| 2013/0185563 A1 | 7/2013 | Djabarov et al. | |
| 2013/0232480 A1* | 9/2013 | Winterfeldt | G06F 8/60 |
| | | | 717/177 |
| 2013/0290234 A1* | 10/2013 | Harris | G06N 5/022 |
| | | | 706/46 |
| 2014/0282353 A1 | 9/2014 | Jubran et al. | |
| 2015/0200959 A1 | 7/2015 | Adam et al. | |
| 2015/0378700 A1 | 12/2015 | Rachamadugu et al. | |
| 2016/0112509 A1 | 4/2016 | Tracht et al. | |
| 2016/0266885 A1* | 9/2016 | Aleksandrov | G06F 8/65 |
| 2017/0046149 A1 | 2/2017 | Quin et al. | |
| 2017/0046378 A1 | 2/2017 | Quin et al. | |
| 2017/0192853 A1* | 7/2017 | Alberti | G06F 8/65 |

OTHER PUBLICATIONS

Nguyen, First Office Action for U.S. Appl. No. 14/824,975, filed Oct. 26, 2016.
Nguyen, Second Office Action (Final) for U.S. Appl. No. 14/824,975, dated Jan. 31, 2017.
Hebert, International Search Report and Written Opinion for PCT/CA2016/050902, dated Oct. 12, 2016.
Mulligan, International Search Report and Written Opinion for PCT/CA2016/050903, dated Oct. 13, 2016.
Nguyen, Advisory Action (Final OA2) for U.S. Appl. No. 14/824,975, dated Apr. 6, 2017.
Nguyen, Third Office Action for U.S. Appl. No. 14/824,975, dated Oct. 30, 2017.
Daye, First Office Action for U.S. Appl. No. 14/824,969, dated Apr. 5, 2018.
Nguyen, Fourth Office Action (Final) for U.S. Appl. No. 14/824,975, dated Feb. 14, 2018.
Anonymous, "Mobile Device Management", Wikipedia, Apr. 14, 2015.
Hepworth, et al., "Model Consistency and Conflict Resolution with Data Preservation in Multi-User Computer Aided Design", Journal of Computing and Information Science in Engineering, vol. 14, No. 2, Mar. 12, 2014.
Milasinovic, "Extended European Search Report for EP16834347", dated Jul. 11, 2018.
Moon, "Extended European Search Report for EP 16834346", dated Jul. 4, 2018.
Muller, "Extended European Search Report for EP 16834348", dated Aug. 9, 2018.
Daye, Notice of Allowance for U.S. Appl. No. 14/824,969, dated Aug. 29, 2018.
Nguyen, Fifth Office Action for U.S. Appl. No. 14/824,975, dated Oct. 2, 2018.
Nguyen, "Sixth Office Action for U.S. Appl. No. 14/824,975", dated Jan. 28, 2019.
Muller, "First Exam Report for EP16834348", dated Apr. 16, 2019.
Nguyen, "Corrected Notice of Allowance for U.S. Appl. No. 14/824,975", dated Apr. 9, 2019.
Milasinovic, "First Exam Report for EP16834347", dated Mar. 1, 2019.
Nguyen, "Notice of Allowance for U.S. Appl. No. 14/824,975", dated Mar. 14, 2019.
Milasinovic, "Second Exam Report for EP 16834347.3", dated Oct. 7, 2019.

* cited by examiner

GROUPS OF ENDPOINTS AND TARGETING OF RELEASES AND PACKAGES TO ENDPOINTS

TECHNICAL FIELD

The present disclosure relates to the management of upgradeable endpoints.

BACKGROUND

A modern motor vehicle is composed of over a thousand separate parts. New vehicle sales around the world exceeded 84 million in 2013. Managing this complexity is a challenge for original equipment manufacturers (OEMs) and their suppliers. For example, airbags manufactured by Takata Corporation were subject to a massive recall in the years 2013 through 2015 affecting close to 40 million vehicles. The size of the recall was necessitated in part by admissions from Takata Corporation that it had little clue as to which cars used its defective airbag inflators.

The complexity of modern motor vehicles extends also to software. An electronic control unit (ECU) is a generic term for any embedded system that controls one or more of the electrical system or subsystems in a motor vehicle. (Taken together, these systems are sometimes referred to as the vehicle's computer, although in fact there is no single computer but multiple computers.) Some modern motor vehicles have dozens of ECUs. Embedded software in ECUs continue to increase in line count, complexity, and sophistication. Some manufacturers are making cars that are connected to wireless cellular networks, making it possible in the future to update software via a download over a wireless network.

The Internet of Things is the network of physical objects or "things" embedded with electronics, software, sensors and connectivity to enable objects to exchange data with the manufacturer, operator and/or other connected devices. Each year, an ever increasing number of embedded devices are combining to create a worldwide network of autonomous embedded systems—the Internet of Things. Managing software updates for an Internet of Things space is very difficult since it is unknown in advance what the properties or capabilities of the thing to be updated will be.

BRIEF DESCRIPTION OF THE DRAWINGS AND APPENDIX

DETAILED DESCRIPTION

Figure 1:
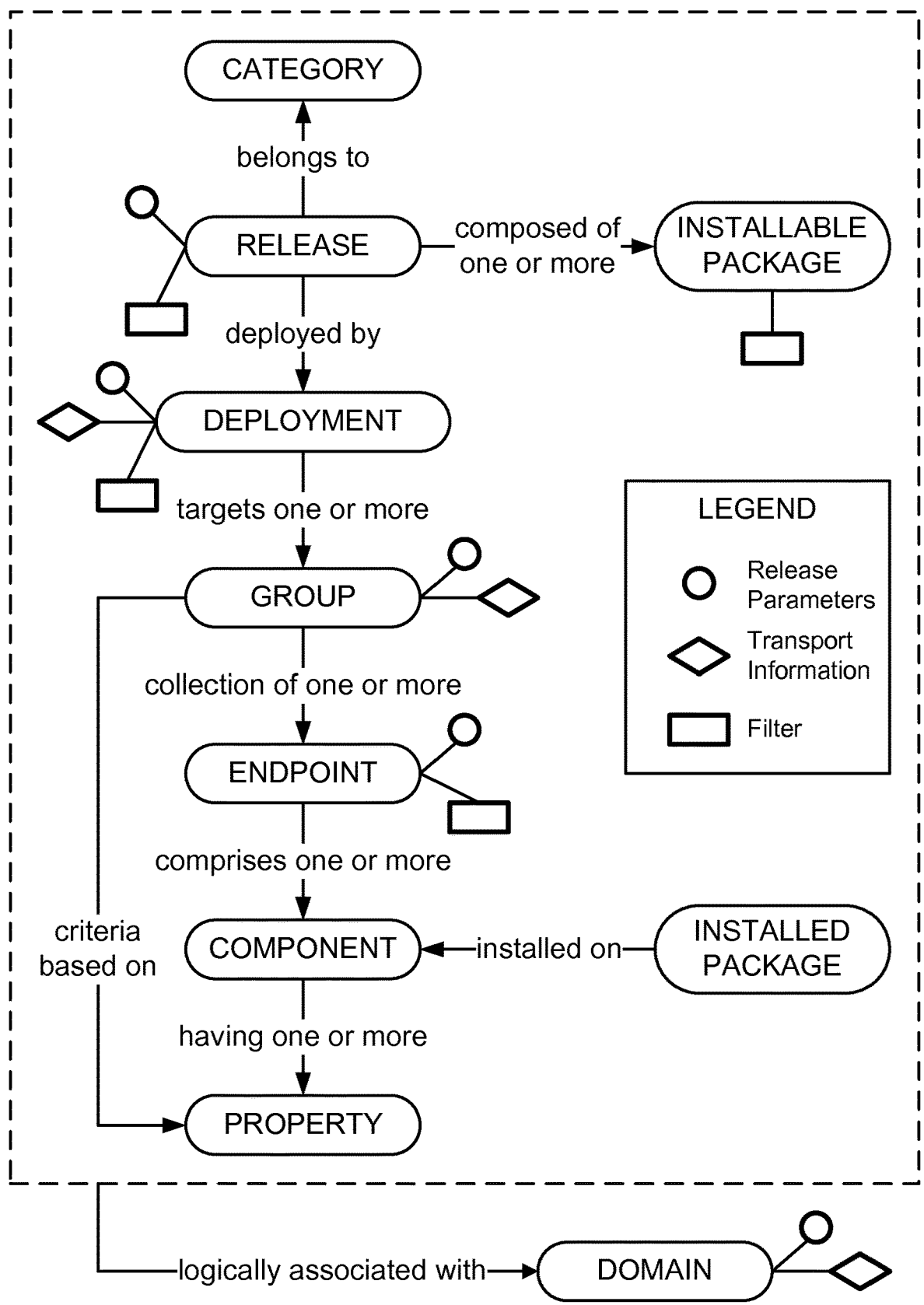
FIG. 1 illustrates relationships between concepts used in this document.

This document describes management of endpoints and of upgrades to the endpoints. FIG. 1 illustrates relationships between concepts used in this document.

A domain is logically associated with multiple endpoints. Each endpoint comprises one or more components. For example, the domain is a manufacturer of motor vehicles, endpoints in the domain are motor vehicles manufactured by that manufacturer, and the components of each motor vehicle include electronic control units (ECUs). In another example, the domain is a factory, the endpoints are the different sites of the factory, and the components at each factory site are the computers at that factory site. In a further example, the domain is a home, the endpoints include a refrigerator, a coffee maker, and a toaster oven, and the components are the embedded systems that control the function of these home appliances. The component may be a sub-component that is nested inside another component. In the motor vehicle example, an engine control module (ECM) and a transmission control module (TCM) may be nested inside a powertrain control module (PCM), all of which are examples of ECUs.

A property of a component is a dynamic property if its existence or its value can be updated or changed over time, in contrast to a fixed, static property that never changes. In the motor vehicle example, the year of manufacture of the vehicle is a fixed, static property, whereas the exterior color of the vehicle is a dynamic property, because the vehicle can be repainted with a different exterior color. The validity of the warranty on the vehicle is a dynamic property, because the warranty is initially valid but expires when not renewed. The rim size is a dynamic property that depends on the size of rims installed on the vehicle. The manufacturer may have installed 16 inch rims on the vehicle, and then the local car dealer may have replaced the original rims with 18 inch rims. In the toaster oven example, the physical dimensions of the toaster oven are fixed, static properties, whereas the temperature setting of the toaster oven is a dynamic property because the temperature setting of the toaster oven can be adjusted. In the factory example, properties of a computer may include identifiers of the hardware components of that computer.

As described in more detail below, a property of a component is represented by a propertyKey-propertyValue pair. A propertyKey is a label or name of the property, and a propertyValue is the data for that property. Examples of propertyKey-propertyValue pairs include (yearOfManufacture, 2015), (GPS coordinates, (43.5172979, −80.5137348)), (RimSize, 16), (MCC-MNC, 302-720), (Temperature, 24), (color, "red") and the like. By using propertyKey-propertyValue pairs to represent properties of components, arbitrary, previously-unknown properties can be represented.

A group is a collection of endpoints that share particular characteristics defined by group criteria, and is a convenient shortcut for management of the endpoints within the group as a whole. Each group is logically associated with the domain. Each group is therefore a different "cross-section" of the "space" of endpoints in the domain. An endpoint may belong to more than one group. Membership in a group ("child group") may be part of the criteria for membership in another group ("parent group"). A group named "ALL" is automatically created for the domain and consists of all endpoints that are logically associated with the domain. Groups may be visualized as leaves of a tree structure, with the "ALL" group as the root of the tree. The group criteria are based on properties of components of endpoints. Thus when a new group is defined, all existing endpoints that satisfy the criteria of the new group automatically belong to the new group, and any subsequently-added endpoints that satisfy the criteria of the new group automatically belong to the new group immediately upon registration of those endpoints. The group criteria may include whether a particular property exists, or whether a particular property is missing (absent, does not exist) or has a null value. In cases where values of a particular property are of a data type that permits comparison, the group criteria may include whether the value of the particular property is equal to, or less than, or greater than a specified value. In the motor vehicle example, a group may consist of all motor vehicles for which the year of manufacture is greater than 2004 and the model is "Focus" or "Fusion". In the factory example, a group may consist of all factory sites having computers that are not connected to printers and that have Intel® Core™ i5 processors.

The group criteria is a filter that is expressed using a particular grammar, referred to in this document as "the Query Grammar". An example definition of the Query Grammar is provided in Appendix A. The group criteria, and any other filter built using the Query Grammar, may take the form "propertyKey operator" in the case of the operators "exists" and "missing/null", for example "model exists" or "warranty missing". The group criteria, and any other filter built using the Query Grammar, may take the form "propertyKey operator data" in the case of comparison operators, where the data type is a supported data type. For example, supported data types may include Integer, Float, String, Version, Date, Time and Datetime. Comparison operators may include less than ("<"), greater than (">"), less than or equal to ("<="), greater than or equal to (">="), and equals ("="). The Boolean operator "AND" and the Boolean operator "OR" may be used to combine shorter filters into longer filters. Parentheses may be used to signify the order of operations. Table 1 lists features of the Query Grammar.

TABLE 1

Features of the Query Grammar

| Description | Example |
|---|---|
| Simple expressions with left side always a propertyKey, right side always a propertyValue propertyValue type is inferred and applied dynamically | model = "Focus" AND yearOfManufacture>2000 model = "300" is different from model = 300 |
| Property keys may be nested in a data structure | package.id |
| Comparison operators | >, <, >=, <=, = |
| Operators to check for propertyValues missing/null or present | model exists, warranty missing |
| IN operator for a shorthand to multiple equals | model IN ("Fiesta", "Focus", "Fusion") |
| Integer types, expressed either as decimal or hexadecimal | 5, 0x5 |
| Float type | 5.0 |
| String type (supports Unicode and escaping) | "red\r\n" |
| Version type | v10.1.0.1020 |
| Date type | 2013-07-04 |
| Time type (with optional timezone and seconds) | 12:00, 12:10:30Z, 12:10:30-07 |
| Datetime type (combines date/time) | 2013-07-04T12:10:30-07:30 |
| Support any combination of Boolean AND/OR combinations with | yearOfManufacture > 2000 AND |

TABLE 1-continued

Features of the Query Grammar

| Description | Example |
|---|---|
| parentheses to adjust the order in which the operations are performed | (version < v10.1.0.1020 or hwid = 0x12345678) AND dateval >= 2013-07-04 AND (carrierID IN (0x1, 0x5, 0x6) OR model = "Focus") |

A package is an upgradeable item of content or data that is currently installed on a component or that is installable on the component. For example, a package could be a calibration file or a configuration file. In the motor vehicle example, a package could be the set of maps used by the vehicle's navigation system, or a single map, or a single tile of a map. In the motor vehicle example, a package could be embedded software for the seat adjustment ECU. In the toaster oven example, a package could be data of an image to be burned into a piece of bread. In the factory example, a package could be a patch to a software program that is currently installed on three of the factory's computers. The size of the package may be anything from a single bit to more than a terabyte. An identifier of the package and its version are similar to properties of components in that they can appear in filters built using the Query Grammar, including group criteria. A package manifest contains information relevant to a package. The package manifest optionally includes a filter built using the Query Grammar, thereby targeting endpoints at the package level. The package manifest optionally includes dependencies (built using the Query Grammar) that must be checked before the package can be delivered to the endpoint.

A component is an upgradeable entity, by virtue of having at least one package installed or installable on the component. An endpoint is an upgradeable entity by virtue of the endpoint having one or more components that are upgradeable. Installing one or more packages on a component of an endpoint (or uninstalling one or packages from a component of the endpoint) is an act that upgrades the endpoint.

A release is a collection of one or more packages to be managed together as a single unit. Each release belongs to a category within the domain, and is uniquely identified within the domain by an identifier of the category and a monotonically increasing version. A deployment is used to deploy a release to one or more targeted groups of endpoints in order to upgrade those endpoints. In the event that two or more groups are targeted by the deployment, the targeted groups are prioritized within the deployment. There is a one-to-one relationship between releases and deployments. A package may be designated as enabled or disabled in a release. Only packages that are enabled in the release are actually deployed. An identifier of a release's category and an identifier of the release's version are similar to properties of components in that they can appear in filters built using the Query Grammar.

Releases and packages are targeted to endpoints using filters built using the Query Grammar and other mechanisms. Filters are illustrated with rectangles in FIG. 1. By virtue of its deployment, a release is targeted to endpoints that belong to groups that are targeted by the deployment, the groups defined by a group criteria built using the Query Grammar. A release R optionally includes a filter built using the Query Grammar, thereby targeting endpoints at the release level. A package is targeted to endpoints by virtue of the package being included in a release R that is targeted to the endpoints. A package manifest optionally includes a filter built using the Query Grammar, thereby targeting endpoints at the package level. When querying for available releases and packages, an endpoint may optionally specify a release resolution, thereby restricting which packages and releases will be made available to that endpoint in a response to the query. The endpoint may optionally include in the query a release filter built using the Query Grammar, to restrict at the endpoint level which releases are made available. The endpoint may optionally include in the query a package filter built using the Query Grammar, to restrict at the endpoint level which packages are made available. (The query from the endpoint is a definition request, described in more detail below.)

When a release R is deployed by a deployment D and an endpoint X is sent a message regarding deployment of the release R to that endpoint, the message includes the release R provided that all of the following conditions are satisfied: i) the endpoint X belongs to at least one group that is actively targeted by the deployment D, ii) if the release R includes a release-level filter built using the Query Grammar that refers to category identifiers and release versions, then the endpoint X passes the filter, iii) if the query from the endpoint X specifies a release resolution, the release R satisfies the release resolution, and iv) if the query from the endpoint X includes a release filter built using the Query Grammar, then the release R passes the release filter. (The message is a definition response, described in more detail below.)

The package or packages in the release R included in the message are present provided that all of the following conditions are satisfied: i) each package is defined as part of and enabled within the release R, ii) if the query from the endpoint X includes a package filter built using the Query Grammar that refers to package identifiers and package versions, then each package passes the package filter, iii) if any package manifest includes a filter built using the Query Grammar, then the endpoint X passes the filter, and iv) the endpoint X satisfies any dependency criteria, built using the Query Grammar, defined for each package.

Transport information describes how an endpoint is to obtain a release. Transport information may include settings ("allowed bearer settings") that specify which bearers are allowed, from among possible bearers that include WI-FI, BLUETOOTH, WIRED, 2G, 3G and 4G. Transport information may include settings ("transport settings") that specify an order of priority that an endpoint should use when selecting a transport type for the download of a release. Possible types of transport are described in Table 2.

TABLE 2

Transport Types

| Transport Type | Description |
| --- | --- |
| LOCAL-STORAGE | The release is available at the endpoint itself (for example, stored in memory at the endpoint, or accessible via a peripheral device such as a Universal Serial Bus (USB) key) |
| ETHERNET | The endpoint is to obtain the release via a wired network connected to the endpoint |
| WI-FI | The endpoint is to obtain the release via a wireless local area network connected to the endpoint |

TABLE 2-continued

Transport Types

| Transport Type | Description |
| --- | --- |
| CELLULAR | The endpoint is to obtain the release via a wireless cellular network connected to the endpoint |
| BLUETOOTH | The endpoint is to obtain the release via a wireless personal area network in which the endpoint participates |

Allowed bearer settings may be indicated as in the following example: "allowedBearers": ["4G", "WI-FI"]

Transport settings may be indicated as in the following example:

"transports" : [  { "ordinal" : 1, "value" : "LOCAL-STORAGE" }
                 { "ordinal" : 2, "value" : "ETHERNET" }
                 { "ordinal" : 3, "value" : "WI-FI" }
                 { "ordinal" : 4, "value" : "CELLULAR" }
                 { "ordinal" : 5, "value" : "BLUETOOTH" }
]

Transport information is illustrated with diamond shapes in FIG. 1. Allowed bearer settings may be specified at the domain level, at the group level, and at the deployment level (on a per-targeted group basis). Transport settings may be specified at the domain level, at the group level, and at the deployment level (on a per-targeted group basis). The specification of allowed bearer settings at the group level or at the deployment level is accompanied by an indication of whether to ignore that level's allowed bearer settings. The specification of transport settings at the group level or at the deployment level is accompanied by an indication of whether to ignore that level's transport settings. In general, conflicts in transport information are resolved by assigning different priorities to different levels. Transport information is then prioritized according to the level at which it is specified. The levels are ordered by priority as described in Table 3.

TABLE 3

Priorities of Levels (for Transport Information)

| Priority | Level |
| --- | --- |
| Lowest | Domain |
| . . . | Group |
| Highest | Deployment |

Release parameters are sets of information that are sent to an endpoint when a release is deployed to that endpoint. Release parameters are illustrated with circles in FIG. 1. As discussed in more detail below, release parameters may be specified at the domain level, at the group level, at the release level, at the deployment level (on a per-targeted group basis), and at the endpoint level. As discussed in more detail below, some release parameters are defined with multiple values and then are evaluated to a single value for a particular endpoint based on properties of that endpoint. In general, conflicts in release parameters are resolved by assigning different priorities to different levels. Release parameters are then prioritized according to the level at which they are defined. The levels are ordered by priority as described in Table 4.

TABLE 4

Priorities of Levels (for Release Parameters)

| Priority | Level |
|---|---|
| Lowest | Domain |
| ... | Group |
| ... | Release |
| ... | Deployment |
| Highest | Endpoint |

This document describes a data model for representing endpoints, components of endpoints, properties of components, packages that are installed on components, groups of endpoints, packages to be released, releases to be deployed, deployments, release parameters, and transport information. The data model, and the management system and methods that make use of the data model, are independent of the actual endpoints, components, properties, packages and releases to be represented. The data model, management system and methods work for motor vehicles, factories, refrigerators, coffee makers, toaster ovens, and any other upgradeable entity, even though those entities are composed of different components having different properties and having different packages installed on the components. The data model, management system and methods are flexible to adjust to arbitrary, previously unknown endpoints, components, properties, packages, groups, releases, deployments, release parameters, and transport information. Even after the management system is configured for a particular domain, the management system can be reconfigured to accommodate additional endpoints, components, properties, packages, groups, releases, deployments, release parameters and transport information.

Figure 2:
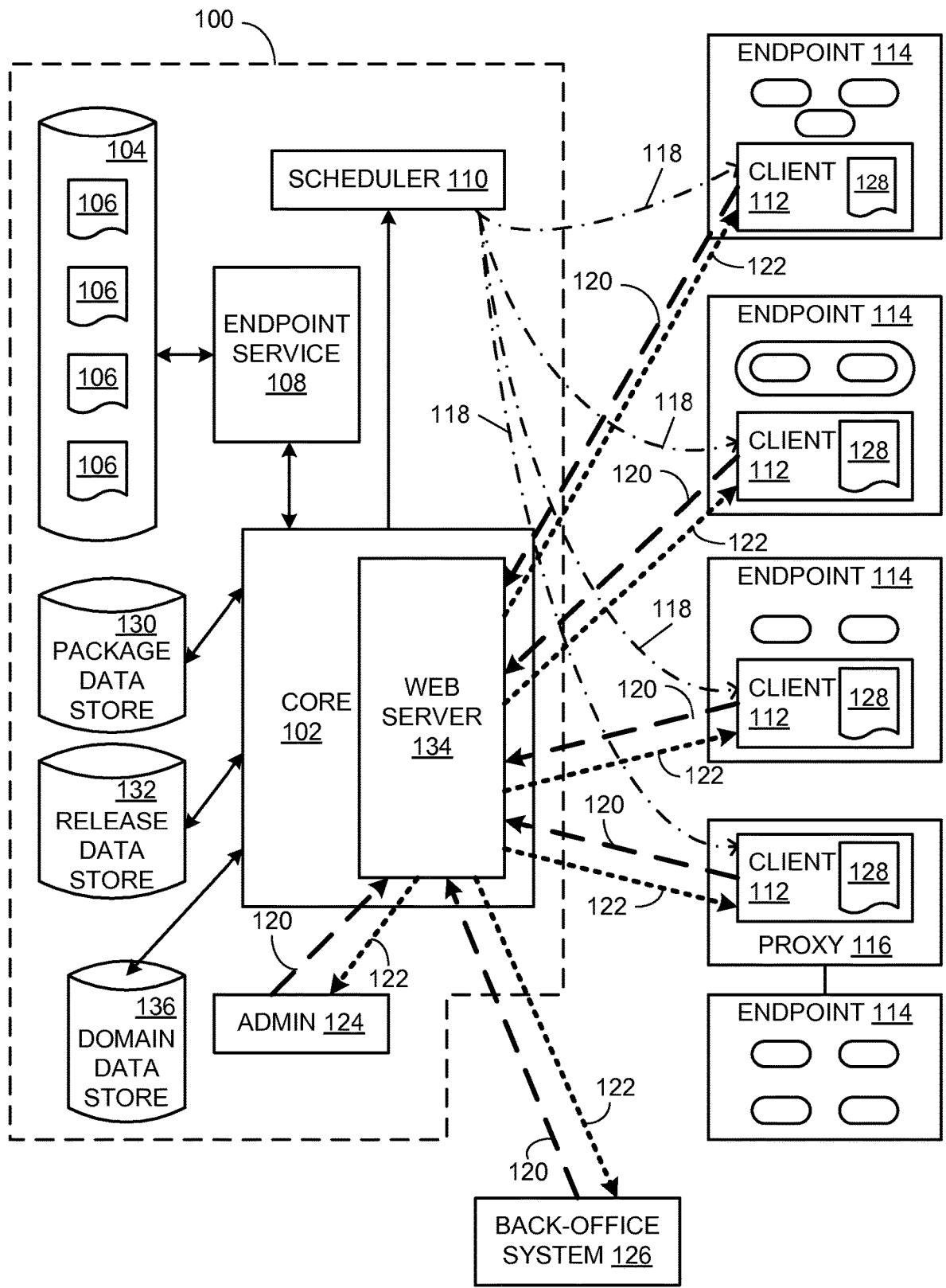
FIG. 2 illustrates an example computer system for managing endpoints.

FIG. 2 is an illustration of an example computer system 100 for management of endpoints and of upgrades to the endpoints. The computer system 100 comprises a core 102, an endpoint data store 104 that stores data structures 106 representing endpoints, an endpoint service 108 that maintains the endpoint data store 104, and a scheduler 110. The scheduler 110 is coupled to a computer (not shown) that is able to deliver push notifications, for example, a Simple Mail Transfer Protocol (SMTP) server, an HTTP push server, or a Short Message System (SMS) gateway. The computer system 100 works with an endpoint client application 112, which may be installed on an endpoint 114 or alternatively on a proxy computing device 116 for the endpoint 114. The endpoint client application 112 handles push notifications 118 (illustrated as dotted arrows) received from the scheduler 110, generates requests 120 (illustrated as dashed arrows) to be sent to the core 102 and handles responses 122 (illustrated as dashed-and-dotted arrows) received from the core 102.

The data structures 106 representing endpoints contain elements that may have been aggregated or accumulated from different sources. One source is the endpoint client application 112. Another source is a human user (not shown) of an administration interface 124 of the core 102. A further source is a back-office system 126 (a third party system) that communicates with the core 102. Client software (not shown) is installed on the back-office system 126 for direct communication with the core 102. Accordingly, FIG. 2 shows requests 120 and responses 122 between these sources and the core 102. Other possible sources that contribute elements that are aggregated into the data structures 106 include in-field diagnostic tools (not shown), repair shops (not shown), and end-user applications (not shown).

The endpoint client application 112 maintains its own local structure 128 representing the endpoint 114 according to the current information available to the endpoint client application 112. Unlike the data structure 106, the local structure 128 does not contain any elements aggregated from different sources. Rather, the endpoint client application 112 is the sole source of elements for the local structure 128. The endpoint client application 112 applies a checksum function, for example, SHA-1 or MD5, to the local structure 128 to compute a local endpoint checksum that uniquely represents the current content of the local structure 128. As a status or configuration of the endpoint 114 changes, the endpoint client application 112 updates its local structure 128 and recomputes the local endpoint checksum. When sending requests 120 to the core 102, the endpoint client application 112 may include the local endpoint checksum. The core 102 may then compare the newly-received local endpoint checksum to a stored checksum for the endpoint 114 in order to determine how to respond to the request 120. The stored checksum may be a previously-received local endpoint checksum or may be computed by the core 102 by applying the same checksum function to a temporary structure gleaned from the data structure 106 by filtering out all elements other than those from the endpoint client application 112.

While most elements of the system 100 are configurable and independent of the actual endpoints, components, properties, packages and releases to be represented, each endpoint client application 112 is specific to the endpoint 114 on which it is installed (or for which it is installed on the proxy computing device 116). For example, the endpoint client application installed on a coffee maker is different from the endpoint client application installed on a refrigerator and both are different from the endpoint client application installed on a motor vehicle.

The core 102 maintains a package data store 130 that stores metadata about packages (including package manifests), and a release data store 132 that stores metadata about releases. Group information, deployment information, and release parameters may be stored internally by the core 102.

In some implementations, the core 102 comprises a web server 134, for example, an Apache Tomcat™ server, and the requests 120 and the responses 122 are communicated over the HyperText Transfer Protocol (HTTP) using the same HTTP verbs (GET, POST, PUT, DELETE, etc.) which web browsers use to retrieve web pages and to send data to remote servers. In other implementations, the requests 120 and the responses 122 are communicated using an Application Layer protocol other than HTTP.

In some implementations ("single-domain implementations"), the system 100 manages a single domain. In other implementations ("multi-domain implementations"), the system 100 is capable of managing multiple domains, each domain logically associated in a one-to-many relationship with its properties, its components, its endpoints, its groups, its packages, its releases, and its categories. That is why the dashed lines in FIG. 1 encompass all of those concepts. The system 100 provides a complete sandbox per domain so that all information specific to one domain is kept completely separate from all information specific to another domain. For example, the system 100 may manage multiple domains, such as a test domain and a production domain. The core 102 maintains a domain data store 136 that stores configurable domain-wide integrity constraints, a configurable domain-wide conflict resolution policy, configurable domain-wide transport information, configurable domain-wide release parameter defaults, and other configurable domain-wide defaults that are applicable to all endpoints and groups logically associated with a domain.

In one implementation, the data structure 106 comprises a single document (or multiple documents), and the endpoint data store 104 comprises a document store. For example, the data structure may employ JavaScript Object Notation (JSON), as described in "The JSON Data Interchange Format", Standard ECMA-404, first edition, October 2013. In another example, the document may be encoded in eXtensible Markup Language (XML). In another implementation, the endpoint data store 104 comprises a relational database, and the data structure 106 comprises a collection of records.

The core 102, the endpoint service 108, the scheduler 110, and the administration interface 124 may be implemented in a distributed computing environment. Elements of the core 102 and the endpoint service 108 may be replicating elements. The endpoint data store 104, the package data store 130, the release data store 132, and the domain data store 136 may be replicated. The core 102, the endpoint service 108, the scheduler 110, and the administration interface 124 may be implemented by the execution of computer-readable instructions stored in computer-readable media such as physical memory and executed on processors of the computing devices that form the system 100.

Protocol Overview

A Registration Protocol is used by the endpoint client applications 112 and the core 102 to create, update and delete data structures 106 in the endpoint data store 104. The administration interface 124 and the back-office system 126 also use the Registration Protocol to update the data structures 106 in the endpoint data store 104. When using the Registration Protocol, the requests 120 are "registration requests" and the responses 122 are "registration responses". More details regarding registration requests and registration responses are described below in the section entitled Endpoint Data Model.

The endpoint client application 112 uses a Discovery Protocol to discover actions that the core 102 requires the endpoint client application 112 to take. When using the Discovery Protocol, the requests 120 are "discovery requests" and the responses 122 are "discovery responses". A discovery request 120 may indicate why the endpoint client application 112 is sending the discovery request 120. For example, the discovery request 120 may indicate that the endpoint client application 112 was instructed by the core 102 to send the discovery request 120 after expiry of a time interval, and the time interval has now expired. In another example, the discovery request 120 may indicate that a status or configuration of the endpoint has changed, thereby triggering the endpoint client application 112 to send the discovery request 120. In another example, the discovery request 120 may indicate that a user of the endpoint client application 112 commanded that the discovery request 120 be sent. In a further example, the discovery request 120 may indicate that the endpoint client application 112 is sending the discovery request 120 responsive to having received a push notification 118 from the scheduler 110. The discovery request 120 may also include the local endpoint checksum.

The core 102 responds to the discovery request 120 with a discovery response 122 that indicates one or more actions that the endpoint client application 112 is required to take, and, if appropriate, metadata needed for processing the one or more actions. An action may be to wait a specified time interval (specified in the metadata) and then send a new discovery request 120. An action may be to send a registration request, because the core 102 determined that the local endpoint checksum included in the discovery request 120 is not identical to the stored checksum. An action may be to send a definition request (described below), because the core 102 has one or more releases to be delivered to the endpoint.

A Definition Protocol is used by the client application 112 to query the core 102 for releases. When using the Definition Protocol, the requests 120 are "definition requests" and the responses 122 are "definition responses". A definition request 120 includes the local endpoint checksum and specifies, from among the release resolution options LATEST-PACKAGE, LATEST-RELEASE, and AVAILABLE-RELEASES, which releases the endpoint seeks to receive. The definition request 120 optionally includes a release filter built using the Query Grammar, to restrict at the endpoint level which releases the endpoint 114 seeks to receive. The definition request 120 optionally includes a package filter built using the Query Grammar, to restrict at the endpoint level which packages the endpoint 114 seeks to receive.

The LATEST-PACKAGE option is specified to instruct the core 102 to merge into a single release the packages having the highest version numbers from among all releases applicable to the endpoint. For example, if applicable release R1 has package A version 2 and package B version 3, and applicable release R2 has package A version 1 and package B version 3, and applicable release R3 has package B version 4, then the endpoint seeks to receive a release that has package A version 2 and package B version 4. The LATEST-RELEASE option is specified to instruct the core 102 to make the release of the highest version in its category available. The AVAILABLE-RELEASES option is specified to instruct the core 102 to include all available releases.

Figure 3:
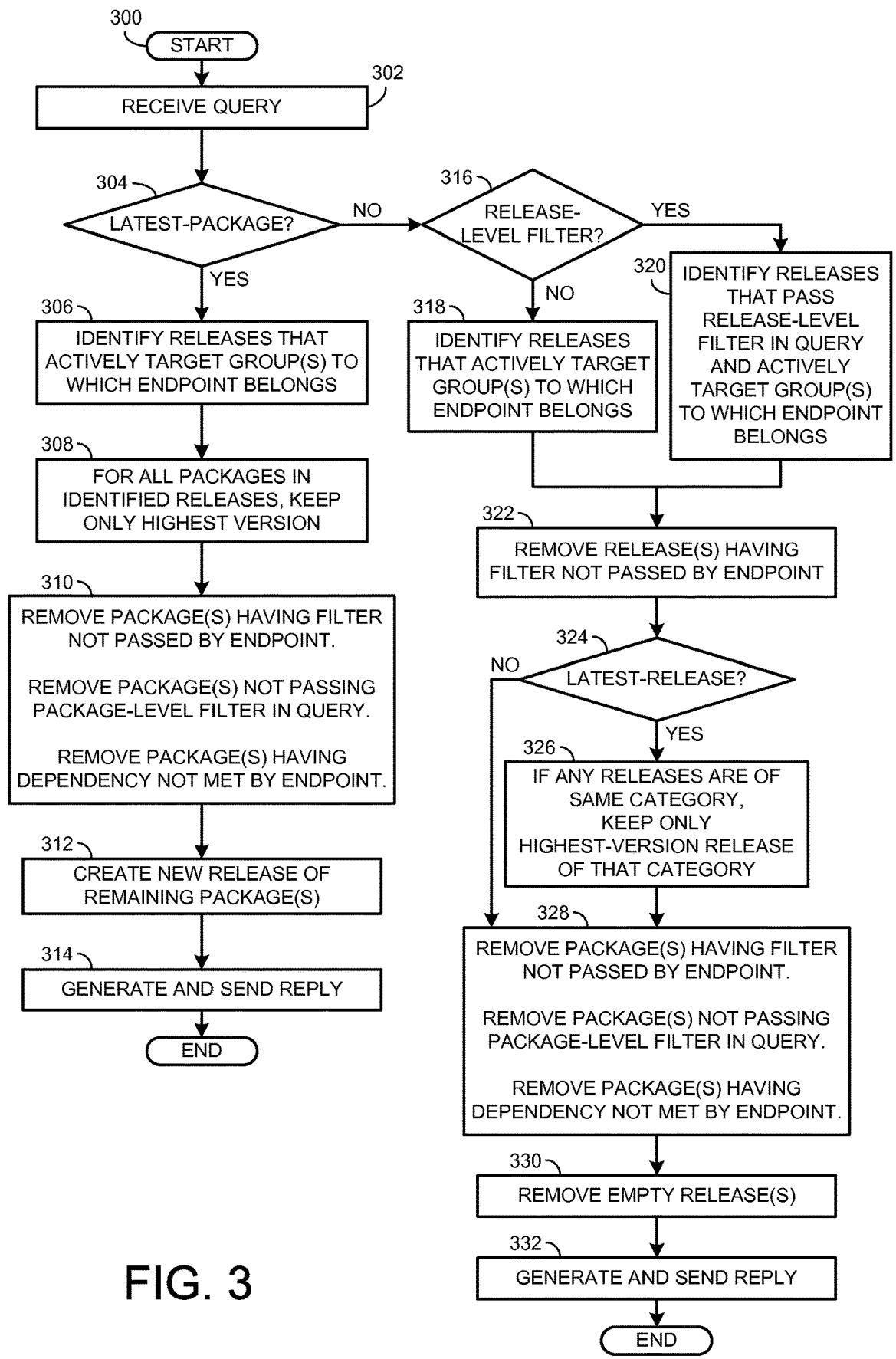
FIG. 3 is a flowchart illustration of an example method for handling a query for releases.

Responsive to receiving a definition request 120, the core 102 responds with a definition response 122 that includes information about the requested releases. FIG. 3 is a flowchart illustration of an example method for handling a query for releases. The core 102 may perform the method of FIG. 3 to determine a definition response 122 to a definition request 120. The method starts at 300. The core 102 receives at 302 a query, for example the definition request 120, from a client application 112 on behalf of an endpoint. The query specifies a release resolution, either LATEST-PACKAGE, or LATEST-RELEASE, or AVAILABLE-RELEASES. If the specified release resolution is LATEST-PACKAGE, as checked at 304, then the core 102 identifies at 306 all releases that actively target one or more groups to which the endpoint belongs. The core 102 then creates at 308 a set of packages from the identified releases, keeping only the highest version of any package from among the packages in the identified releases. At 310, the core 102 removes from the set any package that has a filter that the endpoint does not pass, removes from the set any package that does not pass the optional package-level filters in the query, and removes from the set any package for which dependency criteria is defined and the endpoint does not meet or fulfill the dependency criteria. The core 102 creates a new release at 312 from the remaining package or packages in the set, generates and sends a reply, for example, the definition response 122, based on the new release at 314, and the method ends. Thus in the event that the definition request 120 specifies the LATEST-PACKAGE release resolution, the definition response 122 identifies a single release.

If the specified release resolution is not LATEST-PACKAGE, as checked at 304, and the query does not include a release-level filter, as checked at 316, the core 102 identifies at 318 all releases that actively target one or more groups to which the endpoint belongs and creates a set of identified releases. If the query does include a release-level filter, as checked at 316, the core 102 identifies at 320 all releases that pass the release-level filter in the query and that actively target one or more groups to which the endpoint belongs and creates a set of identified releases. From 318 or 320, the method continues to 322, where the core 102 removes from the set of identified releases any release having a filter that the endpoint does not pass. If the specified release resolution is LATEST-RELEASE, as checked at 324, then the core 102 checks whether any of the releases remaining in the set belong to the same category and keeps only the highest-version of release per category. Once the set includes only releases belonging to different categories, or if the specified release resolution is AVAILABLE-RELEASES, as checked at 324, the method continues at 328. At 328, the core 102 scans the packages of the releases remaining in the set, removes any package that has a filter that the endpoint does not pass, removes any package that does not pass the optional package-level filters in the query, and removes any package for which dependency criteria is defined and the endpoint does not meet or fulfill that dependency criteria. It is possible that a release remaining in the set is empty because its packages have been removed at 328. The core 102 removes any empty release from the set at 330, and generates and sends a reply, for example, the definition response 122, based on the remaining releases and their packages at 330, and the method ends.

For each release identified in the definition response 122, the definition response 122 includes release parameters, transport information, and metadata about the packages in the release. The core 102 may perform the example methods illustrated in FIG. 7 and FIG. 8 to determine which release parameters, if any, to include in the definition response 122. The core 102 may perform the example method illustrated in FIG. 6 to determine which transport information (allowed bearer settings and transport settings), if any, to include in the definition response 122.

The package metadata in the definition response 122 includes the package as streamed inline content or alternatively an indication of where to find a file of the package. As explained in more detail below, a representation of a release includes, for each of its packages, the package as inline content or an indication of whether to find a file of the package and the size of the file. In the event that the size of the file is smaller than a threshold, for example, smaller than 1 kilobyte or smaller than 3 kilobytes or smaller than 5 kilobytes, the core 102 may download the file and insert the content of the downloaded file as streamed inline content in the definition response 122, instead of including in the definition response 122 the indication of where to find the file. A path specifies a unique location of a file within a file system. For example, the indication where to find the file of the package may be a network address, such as a uniform resource locator (URL) and a local path relative to the URL, for example, "url":"http://www(dot)someplace(dot)com" and "path":"/a/b/package1.bar". In another example, the file may be stored in local removable storage such as a Universal Serial Bus (USB) mounted storage or a Secure Digital (SD) card, and the indication where to find the file of the package may take the form of a mounted file system path, such as "/mnt/usb1/package1.bin" or "/mnt/sdcard0/package1.bin". Within a single definition response 112, a package may be provided as streamed inline content, while another package may be identified by an indication of where to find a file of the package via a URL and local path, and yet another package may be identified by an indication where to find a file of the package in local removable storage.

The package metadata in the definition response 122 includes the package manifest, described in more detail below.

The package metadata in the definition response 122 includes instructions how to apply the package to one or more specified components of the endpoint. For example, for each package in the release, the definition response 122 identifies the one or more components of the endpoint to which the package applies and an operation to apply to the identified component with respect to the package. The possible operations are described in Table 4.

TABLE 4

Package Component Operations

| Operation | Description |
|---|---|
| ADD | A package that is not currently installed on the component is to be installed on the component |
| REPLACE | A package that is currently installed on the component is to be replaced by the new version of the package included in the definition response 122 |
| PATCH | A source version of the package is currently installed on the component. A patch to that source version is included in the definition response, for installation on the component, thereby upgrading to a destination version |
| DELETE | A package that is currently installed on the component is to be deleted (uninstalled) |
| KEEP | A package is currently installed on the component and no changes are to be made |

Endpoint Data Model

The data structure 106 stores an identifier, endpointID, that identifies the endpoint that is represented by that data structure 106. In multi-domain implementations, the data structure 106 stores an identifier, domainID, that identifies the domain that is logically associated with the endpoint that is represented by that data structure 106. In multi-domain implementations, endpointID uniquely identifies the endpoint within the domain identified by domainID. That is, the same endpointID may be used to identify endpoints that are logically associated with different domains, however no two endpoints that are logically associated with the same domain will be identified by the same endpointID.

A component of an endpoint is represented in the data structure 106 by a component profile that includes an identifier, componentID. The data structure 106 may use the example format [domainID, endpointID, {component profile(s)}] where braces { } indicate that there may be one or more component profiles present in the data structure 106. Additional fields may be present in the data structure 106. In a single-domain implementation, the domainID field may be absent from the data structure 106.

Properties of a component are represented by respective property tuples in the component profile for that component. Property tuples are described in further detail below. Packages that are installed on a component are represented by respective package profiles in the component profile for that component. A component profile may use the example format [componentID, {property tuple(s)}, {package profile(s)}] where braces { } indicate that there may be zero or one or more property tuples present in the component profile and that there may be zero or one or more package profiles present in the component profile. In cases where a component has one or more sub-components, the component profile may use the example format [componentID, {property tuple(s)}, {package profile(s)}, {component profile(s)}] where braces { } indicate that there may be one or more profiles of sub-components present in the component profile.

A top-level component, of which all other components are sub-components, may be used to represent the endpoint (and its properties) as a whole.

A package profile includes a unique identifier, packageID, of the package, and an indication of the version of the package, and optionally a package manifest. For example, the version of the package may be represented by a string, such as "10.0.0.0". The package manifest may be encoded as a string, for example encoded as a base64 string. A package profile may use the example format (packageID, version, package manifest). More details regarding package manifests are described below in the section entitled Package Manifest Model.

A property tuple that represents a property of a component includes a propertyKey, which is a label or name of the property, and a propertyValue, which is the data for that property. Examples of propertyKey-propertyValue pairs include (yearOfManufacture, 2015), (GPS coordinates, (43.5172979, −80.5137348)), (RimSize, 16), (MCC-MNC, 302-720), (Temperature, 24), (color, "red") and the like. By using propertyKey-propertyValue pairs to represent properties of components, the system 100 allows for future properties to be added without making any changes to the endpoint service 108 and without requiring any changes to existing data structures 106 stored in the endpoint data store 104. By using propertyKey-propertyValue pairs to represent properties of components, the system 100 allows for arbitrary, previously-unknown properties to be represented.

A property tuple is an extension of a propertyKey-propertyValue pair in that the property tuple also includes a sourceID, which identifies the entity that provides the propertyKey-propertyValue pair to the core 102, and a timestamp, which identifies the date and time that the propertyKey-propertyValue pair was received by the endpoint service 108 from the core 102. In the event that the propertyKey-propertyValue pair is received from the endpoint client application 112, the sourceID will identify the endpoint 114 and may be identical to endpointID. The timestamp may be implemented as the number of seconds that have elapsed since a predetermined date and time, for example, the number of seconds that have elapsed since 00:00:00 Coordinated Universal Time (UTC), Thursday, 1 Jan. 1970, not counting leap seconds. Alternatively, the timestamp may be implemented as another representation of date and time, for example, any representation compatible with ISO 8601, 3rd edition, December 2004.

A property tuple may use the example format (propertyKey, propertyValue, sourceID, timestamp). In the case where the property is related to other properties, the property tuple that represents that property may use the example format (propertyKey, {property tuple(s)}) where braces { } indicate that there may be one or more property tuples of related properties present in the property tuple.

For example, an endpoint having three components may be represented in a data structure 106 as follows. In this example, the component profile "wheels" has two property tuples and the second component profile has one property tuple. The third component profile has a property tuple for the property "trim level" and three property tuples representing three related properties nested within a property tuple for the property "colors".

domain: "fleet";
endpoint: "car4";
endpointhash: 29dadee649fcc75450923f0f986e2;

-continued component-profiles:
  [ component: "wheels";
    ( propertyKey: "rim size", propertyValue: 16, source: "dealer",
    time: 1437415830 )
    ( propertyKey: "manufacturer", propertyValue: "Am Racing",
  source: "dealer", time: 1437415830 ) ];
  [ component: "warranty";
    ( propertyKey: "warranty valid", propertyValue: "true", source:
    "dealer", time: 1437415830 ) ];
  [ component: "aesthetics";
    ( propertyKey: "trim level", propertyValue: "EX", source:
    "car4", time: 1436966326 )
    ( propertyKey: "colors",
      ( propertyKey: "exterior", propertyValue: "red", source:
      "car4", time: 1436966326 )
      ( propertyKey: "interior", propertyValue: "ivory", source:
      "car4", time: 1436966326 )
      ( propertyKey: "seat", propertyValue: "leather", source:
      "car4", time: 1436966326 ) ) ]

The endpoint service 108 maintains the endpoint data store 104 by creating, updating, and deleting the data structures 106. The endpoint service 108 also fulfills queries, formulated using the Query Grammar, to search the endpoint data store 104. The endpoint data store 104 aggregates information regarding a particular endpoint 114 that originates from multiple sources, and the information is aggregated over time.

In one implementation ("multi-record"), the endpoint data store 104 stores all received propertyKey-propertyValue pairs. That is, the data structure 106 representing the endpoint 114 may include multiple property tuples for the same property (that is, having the same propertyKey) in the same component profile representing the same component 120. In the motor vehicle example, a car may have originally had the exterior color "white" and later have been repainted "red", and therefore the data structure 106 representing the car, in this implementation, will store two property tuples for the exterior color property in the same component profile. The car will be identified in the results of a query searching for cars having the exterior color "white" and will also be identified in the results of a query searching for cars having the exterior color "red". More generally, a conflict arises in this implementation if the data structure 106 stores two or more property tuples for the same property in the component profile representing a particular component 120 of the endpoint 114. Conflict resolution is discussed below. In order to adhere to storage requirements, the core 102 may control the endpoint service 108 to remove property tuples from the endpoint data store 104 from time to time. For example, property tuples that (according to their timestamp) have been stored in the data structure 106 for the longest time may be removed, provided that the component profile from which the property tuples are being removed have other property tuples for the same property (that is, having the same propertyKey).

In an alternative implementation ("single-record"), the endpoint data store 104 stores only a single property tuple for any given property in the component profile representing the component. The component profile may have more than one property tuple, but for different properties (that is, having different propertyKeys). Conflict resolution is discussed below.

The endpoint service 108 accepts commands from the core 102 to create a data structure for a given endpoint, to update a data structure for a given endpoint and to delete a data structure for a given endpoint. For example, in an implementation where the data structure 106 comprises a single document (or multiple documents) and the endpoint data store 104 comprises a document store, a command to update a data structure may be a command to replace an existing document (or existing documents) with a revised document (or revised documents). Alternatively, the command to update a data structure may be a command to revise an existing document (or existing documents).

A command will be generated by the core 102 responsive to the core 102 receiving a registration request 120. The registration request 120 may be received by the core 102 from a source identified by sourceID. The core 102 may respond to the registration request 120 with a registration response 122 indicating the result of executing the registration request 120 or with a registration response 122 indicating that the registration request 120 is refused.

A registration request 120 includes the identifier, endpointID, that identifies the endpoint that is represented by that data structure 106. In multi-domain implementations, the registration request 120 includes the identifier, domainID, that identifies the domain that is logically associated with the endpoint that is represented by that data structure 106.

The registration request 120 may include a directive that is one of the following predefined directives: SourceReplacement, FullReplacement, SourceComponent, FullComponent, Deregister. A registration request 120 may use the example format Request [domainID, endpointID, sourceID, directive, {component-profile-request(s)}] where braces { } indicate that there may be none or one or more component-profile-requests in the request. If the source of the request is the endpoint client application 112 (on behalf of the endpoint), the component-profile-request may use the example format [componentID, {(propertyKey, propertyValue)}, {(packageID, version)}] where braces { } indicate that there may be one or more propertyKey-propertyValue pairs present in the component-profile-request and that there may be one or more packageID-version pairs present in the component profile request. For any other source, the component-profile-request may use the example format [componentID, {(propertyKey, propertyValue)}] where braces { } indicate that there may be one or more propertyKey-propertyValue pairs present in the component-profile-request.

A registration request 120 that includes the predefined directive Deregister is interpreted by the core 102 as a request to delete the data structure 106 representing the endpoint from the endpoint data store 104.

A registration request 120 from a source identified by sourceID that includes the predefined directive SourceReplacement is interpreted by the core 102 as a request to replace with new property tuples all property tuples in the data structure 106 representing the endpoint that have the same sourceID as the sourceID in the request. The new property tuples use propertyKey-propertyValue pairs provided in the component-profile-request(s) of the request and have the sourceID of the source sending this request. Property tuples in the data structure 106 having a different sourceID are unaffected by this request.

A registration request 120 from a source identified by sourceID that includes the predefined directive FullReplacement is interpreted by the core 102 as a request to delete all property tuples in the data structure 106 representing the endpoint and to create in their stead new component profiles that use parameters of component-profile-request(s) of the request and that have the sourceID that identifies the source sending this request.

A registration request 120 from a source identified by sourceID that includes the predefined directive SourceComponent is interpreted by the core 102 as a request to replace with new property tuples all property tuples in the data structure 106 representing the endpoint that have the same sourceID as the sourceID in the request and that belong to component profiles for components for which the request includes a component-profile-request. The new property tuples use propertyKey-propertyValue pairs provided in the component-profile-request(s) of the request and have the sourceID of the source sending this request. Property tuples in the data structure 106 having a different sourceID are unaffected by this request. Property tuples in the data structure 106 having the same sourceID as the sourceID in the request yet belong to component profiles for components for which the request does not include any component-profile-request are unaffected by this request.

A registration request 120 from a source identified by sourceID that includes the predefined directive FullComponent is interpreted by the core 102 as a request to delete all component profiles in the data structure 106 representing the endpoint for which the request includes a component-profile-request, and to create in their stead new component profiles that use parameters of the request and that have the sourceID that identifies the source sending this request. Component profiles in the data structure 106 for components for which the request does not include any component-profile-request are unaffected by this request.

Configurable domain-wide integrity constraints regarding the property tuples may be stored in the domain data store 136. When processing a registration request 120, the core 102 may reject or ignore a request that does not comply with the integrity constraints, or may modify a request so that the modified request complies with the integrity constraints, or may accept the request as is even though the request does not comply with the integrity constraints.

For example, a registration request 120 may be rejected or ignored unless the request originates from an entity whose sourceID belongs to a set of sourceIDs specifying permissible originators. In the motor vehicle example, requests may be permitted only from the manufacturer, from authorized local dealers, and from authorized third-party vendors.

In another example, a propertyKey-propertyValue pair in the registration request 120 may be rejected or ignored unless its propertyKey belongs to a set of propertyKeys specifying permissible properties stored in the domain data store 136.

In yet another example, a propertyKey-propertyValue pair in the registration request 120 may be rejected or ignored unless one or more specified propertyKey-propertyValue pairs different from that propertyKey-propertyValue pair are already present in the data structure 106 or are also in the registration request 120. In other words, modification or creation of the requested propertyKey-propertyValue pair may be contingent upon the presence or existence of one or more other specified propertyKey-propertyValue pairs.

The domain data store 136 may specify a data type for a property labeled by propertyKey and a propertyKey-propertyValue pair in the registration request 120 may be rejected or ignored in cases where the propertyValue is not of the specified data type. The specified data type may be Boolean, Integer, Float, String, or a more complex object. For example, GPS coordinates may be required to be an ordered pair of latitude and longitude in decimal degrees. The domain data store 136 may specify a range or set of acceptable values for a property labeled by propertyKey and a propertyKey-propertyValue pair in the registration request 120 may be rejected or ignored or modified in cases where the propertyValue is not within the specified range or does not belong to the specified set. For example, a propertyValue of data type Integer may be constrained to the range 1-99. In another example, a propertyValue of data type String may be constrained to have the form of a regular expression, such as [A-Z]. [1-9][0-9]*(\.[1-9][0-9]*), where asterisks indicate the preceding element is present zero or more times. In the factory case, the identifier of an authorized user of the computer may be restricted to belonging to a dynamic set of current employees. The domain data store 136 may specify a default propertyValue for the property labeled by the propertyKey and may modify the request to replace the requested propertyKey-propertyValue pair with a propertyKey-propertyValue pair having the default propertyValue. These kinds of integrity constraints regarding the property tuples may be represented in the domain data store 136 using the example format [propertyKey, datatype, default-value, acceptable-values] where the default-value and acceptable-values fields are optional.

Conflicts are resolved in accordance with the configurable domain-wide conflict resolution policy stored in the domain data store 136. The conflict resolution policy may involve any one or any combination of the propertyKey, propertyValue, sourceID, and timestamp fields.

Figure 4:
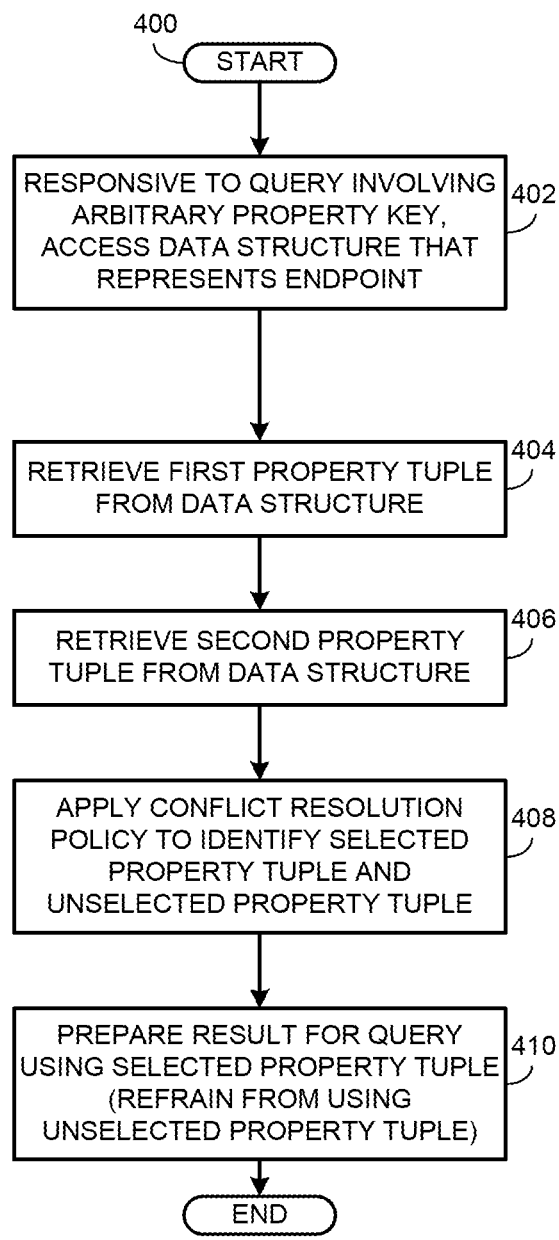
FIG. 4 is a flowchart illustration of an example conflict resolution method for a multi-record implementation.

In the "multi-record" implementation, conflict resolution is performed by the core 102 when accessing stored data structures 106 responsive to a query, and comparisons are made between corresponding fields of accessed property tuples to identify which of the multiple property tuples to select to determine a result for the query. FIG. 4 is a flowchart illustration of an example conflict resolution method performed by the core 102 in the multi-record implementation. The method starts at 400. Responsive to a query involving an arbitrary propertyKey, the core 102 accesses at 402 data structure 106 that represents a particular endpoint. The core 102 then retrieves a first property tuple from the data structure 106 at 404. The first property tuple represents an arbitrary property of a particular component of the particular endpoint, and includes the arbitrary propertyKey. The core 102 then retrieves a second property tuple from the data structure 106 at 406. Just like the first property tuple, the second property tuple represents the arbitrary property of the particular component of the particular endpoint. Just like the first property tuple, the second property tuple includes the arbitrary propertyKey. The core 102 then applies a conflict resolution policy at 408 to identify one of the first property tuple and the second property tuple as a selected property tuple and to identify the other of the first property tuple and the second property tuple as an unselected property tuple. The core 102 then determines a result for the query at 410 by using the selected property tuple and by refraining from using the unselected property tuple. The method then ends.

Figure 5:
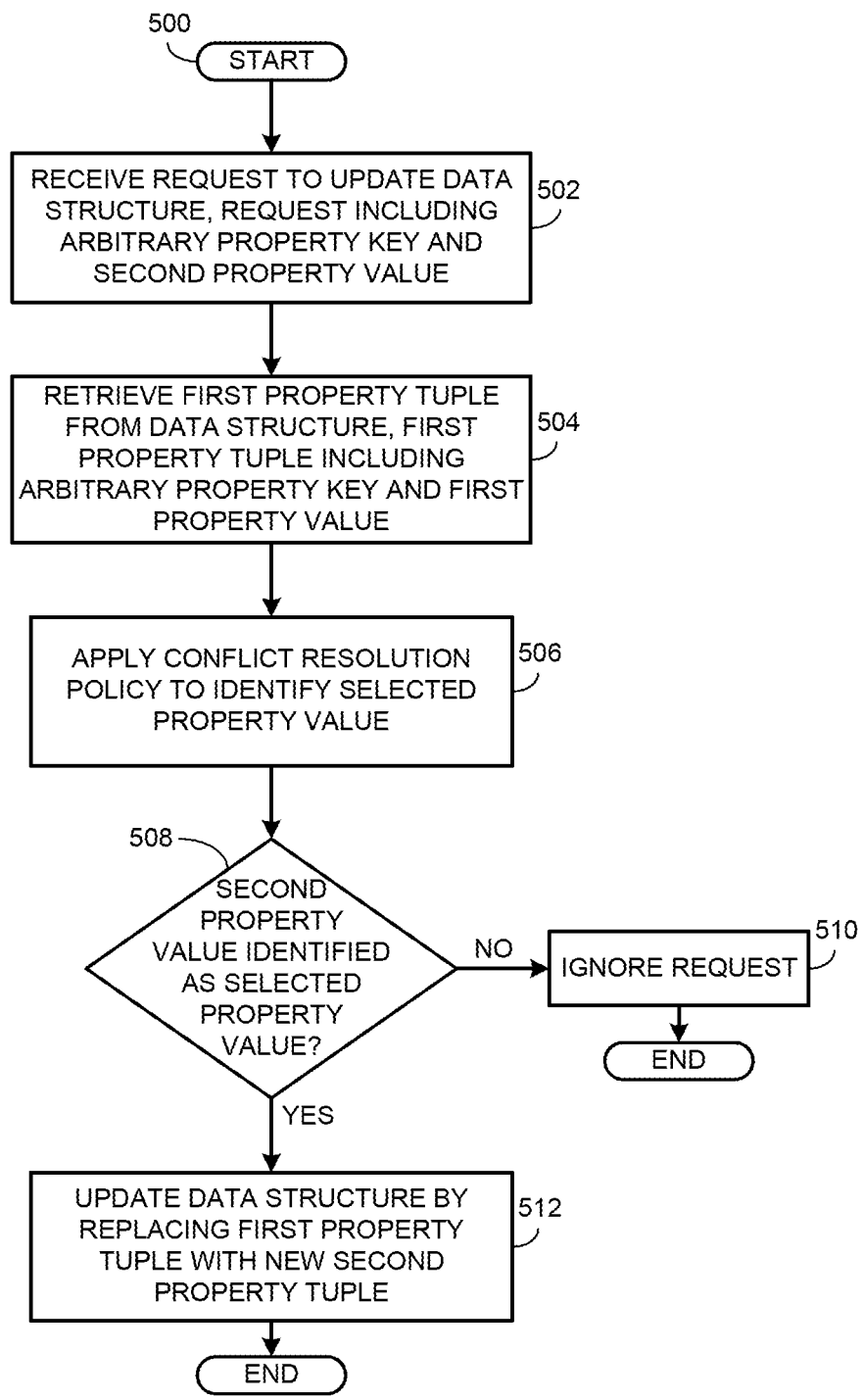
FIG. 5 is a flowchart illustration of an example conflict resolution method for a single-record implementation.

In the "single-record" implementation, conflict resolution is performed by the core 102 when creating or updating data structures 106, and comparisons are made between fields of a stored property tuple and propertyKey-propertyValue pairs of a registration request 120, the sourceID of the source making the registration request 120, and a current timestamp to identify whether the registration request 120 should be rejected (thereby keeping the stored property tuple unchanged) or performed (thereby replacing the stored property tuple with a new property tuple that has the requested propertyKey-propertyValue pair, that identifies the source making the registration request 120, and that uses the current timestamp). FIG. 5 is a flowchart illustration of an example conflict resolution method performed by the core 102 in the single-record implementation. The method starts at 500. The core 102 receives at 502 a request to update a data structure 106 that represents a particular endpoint. The request includes an arbitrary propertyKey that labels or names an arbitrary property of a component of the endpoint and a second propertyValue. Responsive to receiving the request, the core 102 retrieves from the data structure 106 at 504 a first property tuple that includes the arbitrary propertyKey and a first propertyValue that differs from the second propertyValue. The core 102 then applies a conflict resolution policy at 506 to identify one of the first propertyValue and the second propertyValue as a selected property value. If the first propertyValue is identified as the selected property value, as checked at 508, then the core 102 rejects or ignores the request at 510 and the method then ends. If the second propertyValue is identified as the selected property value, as checked at 508, then the core 102 updates the data structure 106 at 512 by replacing the first property tuple with a second property tuple that consists of the arbitrary propertyKey, the second propertyValue, the second source identifier, and a current timestamp. The method then ends.

As mentioned above, the conflict resolution policy may involve any one or any combination of the propertyKey, propertyValue, sourceID, and timestamp fields. For example, a "first in" conflict resolution policy involves a comparison of the timestamp fields, such that the property tuple (or request) with the earliest timestamp is selected, and a "last in" conflict resolution policy involves a comparison of the timestamp fields, such that the property tuple (or request) with the latest timestamp is selected. In another example, a "ranked source" conflict resolution policy involves a comparison of the sourceID fields, based on a configurable ranking of expected sources of propertyKey-propertyValue pairs, such that the propertyKey-propertyValue pair from the source with the higher ranking is selected. The conflict resolution policy may compare sourceID fields as in the "ranked source" conflict resolution policy, followed, in the event that the sourceID fields are identical, by a comparison of timestamp fields as in the "last in" conflict resolution policy.

The conflict resolution policy may be built using the Query Grammar. The conflict resolution policy may involve different sub-policies for different properties (labeled by different propertyKeys).

Release Parameters Data Model

Release parameters are sets of information that are sent to an endpoint when a release is deployed to an endpoint. The endpoint may use the received information from the point of its receipt until installation of all packages in the release has been completed. The sets of information can be created and then reused for multiple releases.

A set of release parameters is uniquely identified within the domain by the identifier setID, and is represented internally by the core 102 by the setID identifier and one or more release parameters. A release parameter in the set may be a simple, non-reusable paramKey-paramValue pair, for example, the paramKey "mandatoryGracePeriod" and the value 5 days. A release parameter in the set may be a multi-valued parameter, which has a different value depending on the properties of the endpoint for which the multi-valued parameter is evaluated. A multi-valued parameter guarantees that only one value is returned out of the set for the given paramKey and in the event that no properties of the endpoint match, there is a default paramValue. Fields of a multi-valued parameter are described in Table 5.

TABLE 5

Fields of a Multi-Valued Parameter

| Field | Type | Description |
| --- | --- | --- |
| multiValuedKey | String | The unique identifier for this paramKey-paramValue pairing |
| valueSet | Array | An array of possible values for the key depending on properties of the endpoint |
| valueSet.filter | String | A filter built using the Query Grammar |
| valueSet.value | String | The paramValue that is associated with this paramKey if the filter passes |
| valueSet.default | Boolean | If true, the paramValue in this valueSet is used as the defaul tparamValue for the paramKey if no filter match is found |

For example, a multi-valued parameter provides descriptions in different languages depending on a locale property of the endpoint, however only one of the descriptions will actually be included in a message sent to any particular endpoint.

```
"multivalue": [
    {"multiValuedKey": "description", "valueSet": "[;
        { "key": "filter", "locale=\"en-US\"", "value": "This update
    includes user experience improvements.", "default": true},
        { "key": "filter", "locale=\"es-US\"", "value": "Esta
    actualización incluye mejoras en la experiencia del usuario.",
    "default": false}
        { "key": "filter", "locale=\"fr-CA\"", "value": "Cette
    mise à jour inclut des améliorations de l'expérience utilisateur.",
    "default": false}
        ]}
]
```

A release parameter in the set may be a reference to another set of release parameters, identified by its setID, thereby reusing that other set of release parameters.

By using paramKey-paramValue pairs to represent release parameters, the system 100 allows for future release parameters to be added without making any changes to the operation of the system, without requiring any changes to the representations of groups and deployments internally in the core 102, and without requiring any changes to the representations of releases in the release data store 132.

Constraints on the values of release parameters may optionally be defined at the domain level. The domain-wide release parameter constraints may specify a data type for values for a parameter labeled by paramKey. The specified data type may be Boolean, Integer, Float, or String. The domain-wide release parameter constraints may specify a default paramValue for a parameter labeled by paramKey. The domain-wide release parameter constraints may specify a range or set of acceptable values for a parameter labeled by paramKey. For example, a paramValue of data type Integer may be constrained to the range 1-99. In another example, a paramValue of data type String may be constrained to have the form of a regular expression, such as [A-Z].[1-9][0-9]*(\.[1-9][0-9]*), where asterisks indicate the preceding element is present zero or more times. The domain-wide release parameter constraints may be represented in the domain data store 136 using the example format [paramKey, datatype, default-value, acceptable-values] where the default-value and acceptable-values fields are optional. When specifying release parameters at the group level, at the deployment level, and at the release level, the core 102 may enforce the domain-wide release parameter constraints.

Domain Data Model

A domain is represented in the domain data store 136 by the following fields: i) an identifier, domainID, that uniquely identifies the domain within the system 100, ii) any configurable domain-wide integrity constraints, iii) any configurable domain-wide conflict resolution policy, iv) optional configurable domain-wide release parameter constraints, v) optional domain-level release parameters that are nominally applicable to all endpoints that are logically associated with the domain, and vi) optional configurable domain-wide transport information. Additional fields may be present in the representation of the domain.

Group Data Model

A group is represented internally by the core 102 by the following fields: i) an identifier, groupName, that uniquely identifies the group within the domain, ii) group criteria built using the Query Grammar, thereby specifying which endpoints belong to the group, iii) optional release parameters that are nominally applicable to all endpoints that belong to the group, and iv) optional transport information, with an indication whether the group-level allowed bearers settings should be ignored and an indication whether the group-level transport settings should be ignored. Additional fields may be present in the representation of the group.

In the event that the group is a sub-group of a parent group, a field with the groupName of the parent group is also included in the group's representation.

In the event that the group is a parent group of two or more sub-groups, there is a potential for conflict in the release parameters. Two or more of the sub-groups may specify the same paramKey in their set of release parameters, yet with different paramValues. For example, the release parameters specified for a group G may include a paramKey "greeting" with a paramValue "Hello", and the release parameters specified for a group H may include the paramKey "greeting" with a paramValue "Hi", where group G and group H are both sub-groups of a parent group J. If the groups G and H are distinct, that is, the groups will never have endpoints in common, then there is no conflict, because an endpoint belonging to the parent group J will also belong to the sub-group G or to the sub-group H, but not to both sub-groups.

One way to resolve the conflict is to specify a paramValue for that same paramKey in the set of release parameters for the parent group. For example, specifying a value "Howdy" for the paramKey "greeting" in the set of release parameters for the parent group J, which trumps the value for the paramKey "greeting" in the sub-groups. Another way to resolve the conflict is to name one of the conflicting sub-groups as the resolving group for the conflicting release parameter. That is, a conflict resolution object having the fields (paramKey, groupName) is defined for the parent group, where groupName identifies one of the conflicting sub-groups. For example, the parent group J may be represented with a ("greeting", H) pair that signifies that for any conflict regarding a release parameter having the paramKey "greeting", the value specified for that paramKey in the group H is the resolved value.

In the event that the group is a parent group of two or more sub-groups, there is a potential for conflict in the transport information. Two or more of the sub-groups may specify transport information. For example, a group G may include allowed bearer settings "2G" and "WIFI" and transport settings with CELLULAR having the highest priority, and a group H may include allowed bearer settings "3G" and "WIFI" and transport settings with LOCAL-STORAGE having the highest priority, where group G and group H are both sub-groups of a parent group J. One way to resolve the conflict is for the parent group to specify transport information. Another way to resolve the conflict is to name one of the conflicting sub-groups as the resolving group for allowed bearer settings, and similarly to name one of the conflicting sub-groups as the resolving group for transport settings. For example, the representation of the parent group J may include a ("allowed bearer settings", H) pair that signifies that the allowed bearer settings specified for group H are to be considered, and may include a ("transport settings", G) pair that signifies that the transport settings specified for group G are to be considered.

The group identified by the groupName "ALL" is automatically created for the domain and consists of all endpoints that are logically associated with the domain and are registered in the system.

Release Data Model

A release is uniquely identified within the domain by a (categoryID, version) pair, where categoryID uniquely identifies within the domain the category to which the release belongs and version that uniquely identifies the release within the identified category. A package is uniquely identified within the domain by a (packageID, packageVersion) pair. A release is represented in the release data store 132 by the following fields: i) categoryID, ii) version, iii) an optional filter built using the Query Grammar, thereby targeting certain endpoints at the release level, iv) optional release parameters that are nominally applicable to all endpoints receiving this release, and, v) for each package included in the release: packageID, packageVersion, a designation of the package as enabled or disabled within the release, a package manifest, and the package as inline content or alternatively an indication of where to find a file of the package and the size of the file. For example, the indication where to find the file of the package may be a network address, such as a uniform resource locator (URL) and a local path relative to the URL, or a path representing the file stored in local removable storage. Additional fields may be present in the representation of the release in the release data store 132.

Package Manifest Model

A package manifest contains information relevant to a package. For each package included in a release, the release information includes a package manifest for that package. The definition response 122 includes the package manifests of the packages of the releases included in the response.

A package manifest may include one or more of the following optional fields: i) a filter built using the Query Grammar, thereby targeting certain endpoints at the package level, ii) dependencies that must be checked before a package can be delivered to an endpoint (also built using the Query Grammar), iii) pre-install conditions that need to be checked by the endpoint before installation of the package on a component of the endpoint can begin, iv) pre-install commands that need to be run on the endpoint before installation of the package on a component of the endpoint can begin, and v) post-install commands that must be run on the endpoint once installation of the package on a component of the endpoint is completed. Additional fields may be present in the package manifest.

A dependency of a particular package indicates one or more other packages (by filtering on the packageID and the packageVersion) that are required to be installed on an endpoint in order for the particular package to be identified in a definition response 122. An example of a dependency is "dependencies":["id=\"com.cc.abcd\" AND version>=\"10.3.4.1\"", "id=\"com.cc.eee\" AND version=\"10.2.3.1\""].

Deployment Data Model

A deployment is used to deploy a release and to make the release available to one or more targeted groups of endpoints. A deployment is represented internally by the core 102 by the following fields: i) an identifier, categoryID, that uniquely identifies within the domain the category to which the release belongs, ii) an identifier, version, that uniquely identifies the release within the identified category, and iii) for each group targeted by the deployment: 1) the groupName of the targeted group, 2) an indication whether this deployment should send push notifications, 3) an indication whether this deployment is active or inactive for the targeted group, 4) optional release parameters that are nominally applicable to all endpoints in the targeted group receiving this release, and 5) optional transport information, with an indication whether the deployment-level allowed bearers settings should be ignored and an indication whether the deployment-level transport settings should be ignored. In the event that a deployment targets two or more groups, each targeted group is assigned a priority to permit conflict resolution if the same release parameter key appears for different targeted groups but with different values and also to determine which transport information to include in the definition response. Additional fields may be present in the representation of the deployment.

Determination of Transport Information

Figure 6:
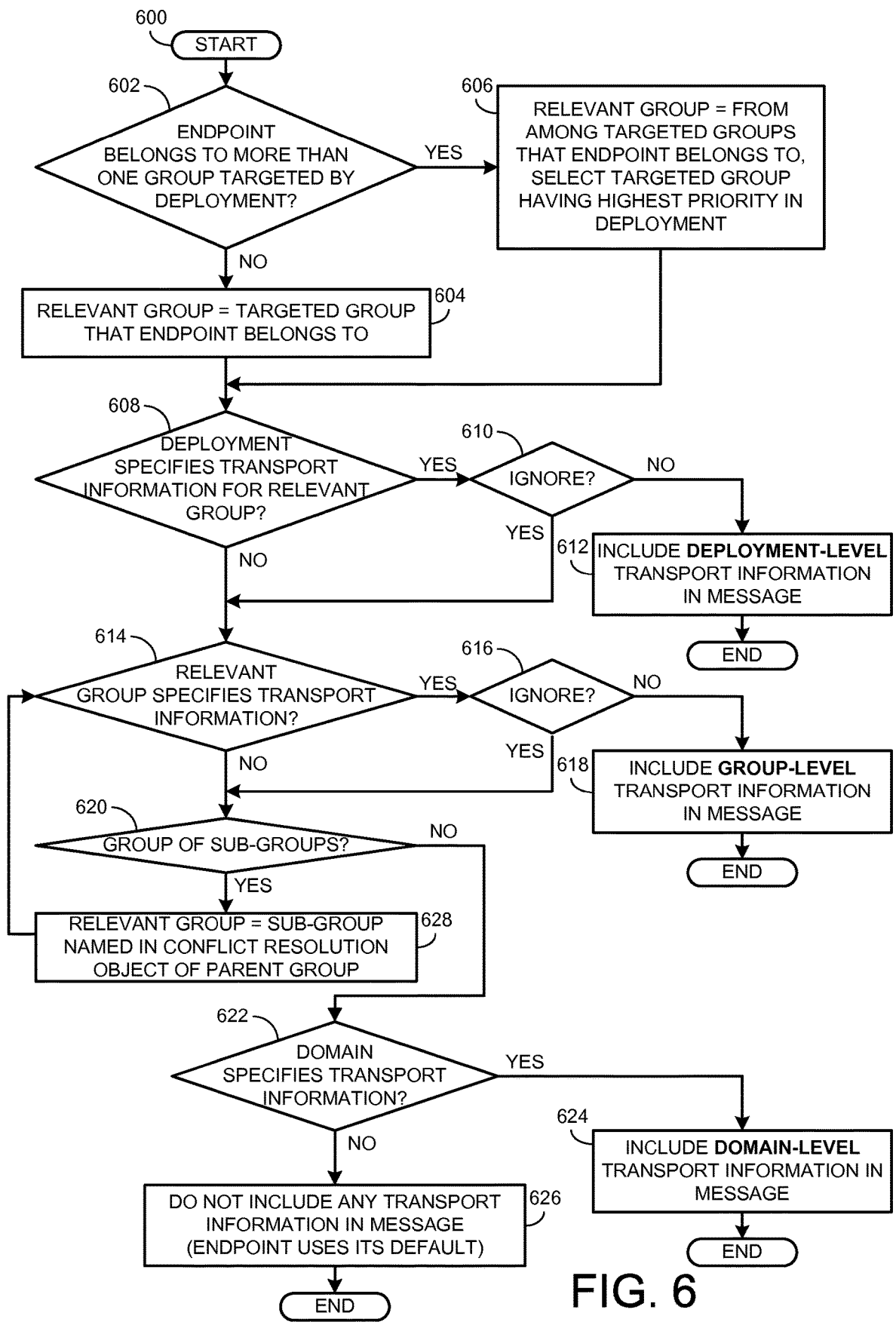
FIG. 6 is a flowchart illustration of an example method for determining which transport information, if any, is included in a message sent to an endpoint regarding a release.

When a release R is deployed by a deployment D and an endpoint X is sent a message regarding deployment of the release R to that endpoint, the message may include transport information. (The message is a definition response.) FIG. 6 is a flowchart illustration of an example method for determining which transport information, if any, is included in the message. The method is performed independently for allowed bearer settings and for transport settings.

The method of FIG. 6 starts at 600. It is checked at 602 whether the endpoint X belongs to more than one group targeted by the deployment D that deploys the release R. If the endpoint X belongs only to one group G targeted by the deployment D, then a relevant group is that targeted group G, as determined at 604. If the endpoint X belongs to two or more groups, say G and H, that are targeted by the deployment D, then from among the groups that the endpoint X belongs to and that are targeted by the deployment D, the relevant group is the group with the highest priority in the deployment D, as determined at 606.

If the deployment D specifies transport information for the relevant group, as checked at 608, and the specified deployment-level transport information for the relevant group is not accompanied by an indication to ignore the settings, as checked at 610, then the deployment-level transport information for the relevant group is included in the message at 612, and the method ends.

If the specified deployment-level transport information for the relevant group is accompanied by an indication to ignore the settings, as checked at 610, or the deployment D does not specify transport information for the relevant group, as checked at 608, then the method continues at 614 with a check whether the relevant group specifies transport information.

If the relevant group specifies transport information, as checked at 614, and the specified group-level transport information is not accompanied by an indication to ignore the settings, as checked at 616, then the group-level transport information of the relevant group is included in the message at 618, and the method ends.

If the specified group-level transport information is accompanied by an indication to ignore the settings, as checked at 616, or the relevant group does not specify transport information, as checked at 614, then the method continues at 620 with a check whether the relevant group is a parent group of sub-groups.

If the relevant group is not a parent group, as checked at 620, then the method continues at 622 with a check whether the domain specifies transport information. If the domain specifies transport information, as checked at 622, then the domain-level transport information is included in the message at 624, and the method ends. If the domain does not specify transport information, then no transport information is included in the message at 626, and the method ends.

If the relevant group is a parent group, as checked at 620, and the endpoint X belongs to two or more of the sub-groups, then there is a conflict as to which of the sub-groups should be checked for group-level transport information. The definition of the parent group includes a conflict resolution object that names one of the sub-groups as the determining group in conflicts regarding transport information, and it is the named sub-group that is deemed the relevant group at 628. The method then continues at 614 with a check whether the relevant group specifies transport information.

In other words, and as described above in Table 3, deployment-level transport information trumps group-level transport information, which in turn trumps domain-level transport information. In the event that transport information is not specified at any of these levels, the message regarding the release R does not include any transport information, and the endpoint X uses its default transport information for downloading the release.

Determination of Resource Parameters

Figure 7:
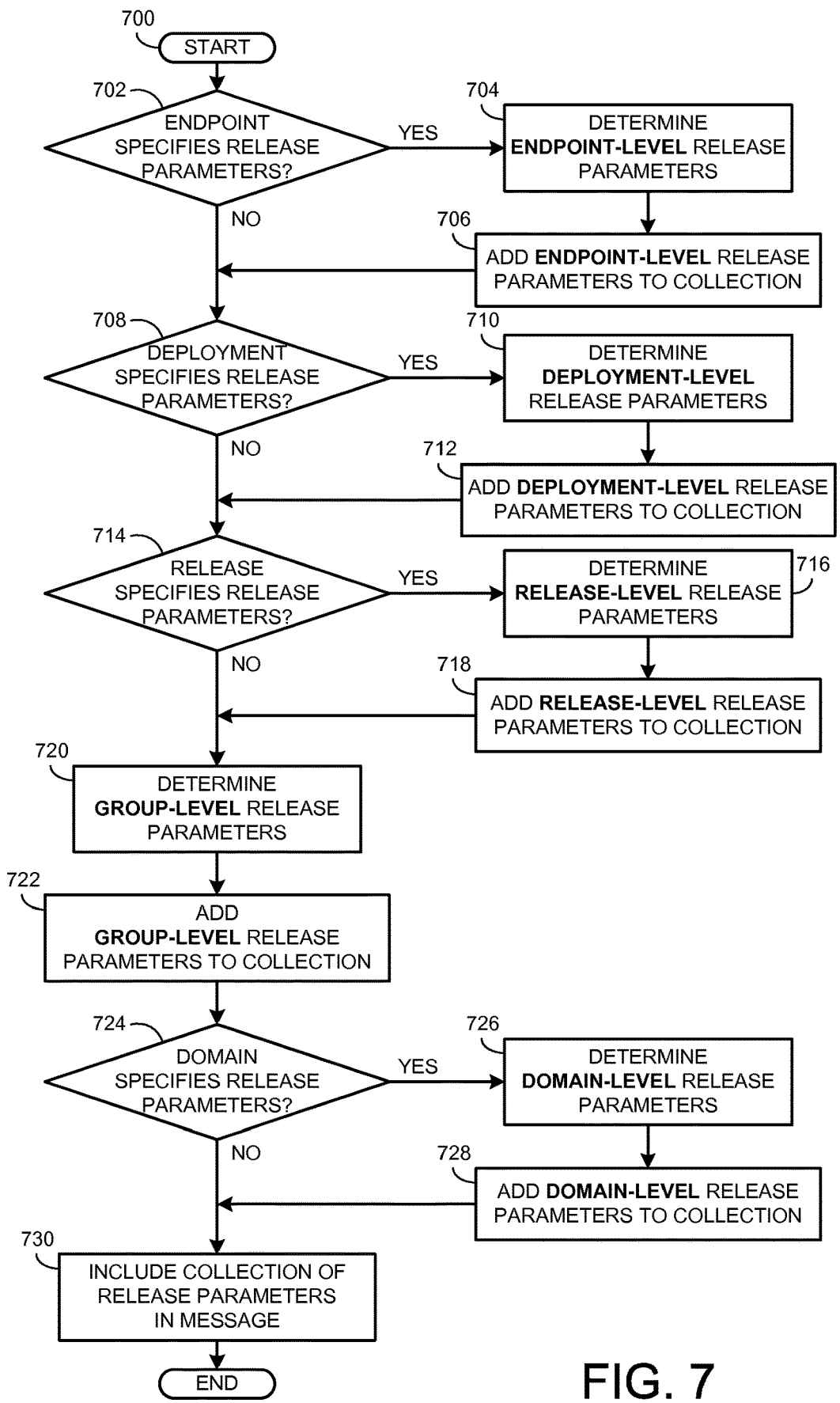
FIG. 7 is a flowchart illustration of an example method for determining which release parameters, if any, are included in a message sent to an endpoint regarding a release.

When a release R is deployed by a deployment D and an endpoint X is sent a message regarding deployment of the release R to that endpoint, the message may include release parameters, resolved for conflicts and evaluated according to properties of the endpoint X. (The message is a definition response.) FIG. 7 is a flowchart illustration of an example method for determining which release parameters, if any, are included in the message.

The method of FIG. 7 starts at 700. If the endpoint X specifies release parameters (meaning that release parameters are specified in the data structure 106 that represents the endpoint X in the data store 104), as checked at 702, then endpoint-level release parameters are determined at 704. If any of the release parameters specified for the endpoint X are multi-valued parameters, those release parameters are evaluated for the endpoint X, yielding paramKey-paramValue pairs that, together with simple paramKey-paramValue pairs specified for the endpoint X, form the endpoint-level release parameters. The endpoint-level release parameters are added at 706 to a collection.

If the endpoint X does not specify any release parameters, as checked at 702, or once the endpoint-level release parameters are added to the collection at 706, the method continues with a check at 708 whether the deployment D specifies release parameters. If the deployment D specifies release parameters, as checked at 708, then deployment-level release parameters are determined at 710. If any of the release parameters specified for the deployment D are multi-valued parameters, those release parameters are evaluated for the endpoint X, yielding paramKey-paramValue pairs that, together with simple paramKey-paramValue pairs specified for the deployment D, form the deployment-level release parameters. The deployment-level release parameters are added at 712 to a collection. Any deployment-level release parameter having a paramKey that is identical to the paramKey of an existing release parameter in the collection is ignored and is not added to the collection and is omitted from the collection of release parameters included in the message.

If the deployment D does not specify any release parameters, as checked at 708, or once the deployment-level release parameters are added to the collection at 712, the method continues with a check at 714 whether the release R specifies release parameters. If the release R specifies release parameters, as checked at 714, then release-level release parameters are determined at 716. If any of the release parameters specified for the release R are multi-valued parameters, those release parameters are evaluated for the endpoint X, yielding paramKey-paramValue pairs that, together with simple paramKey-paramValue pairs specified for the release R, form the release-level release parameters. The release-level release parameters are added at 718 to the collection. Any release-level release parameter having a paramKey that is identical to the paramKey of an existing release parameter in the collection is ignored and is not added to the collection and is omitted from the collection of release parameters included in the message.

Figure 8:
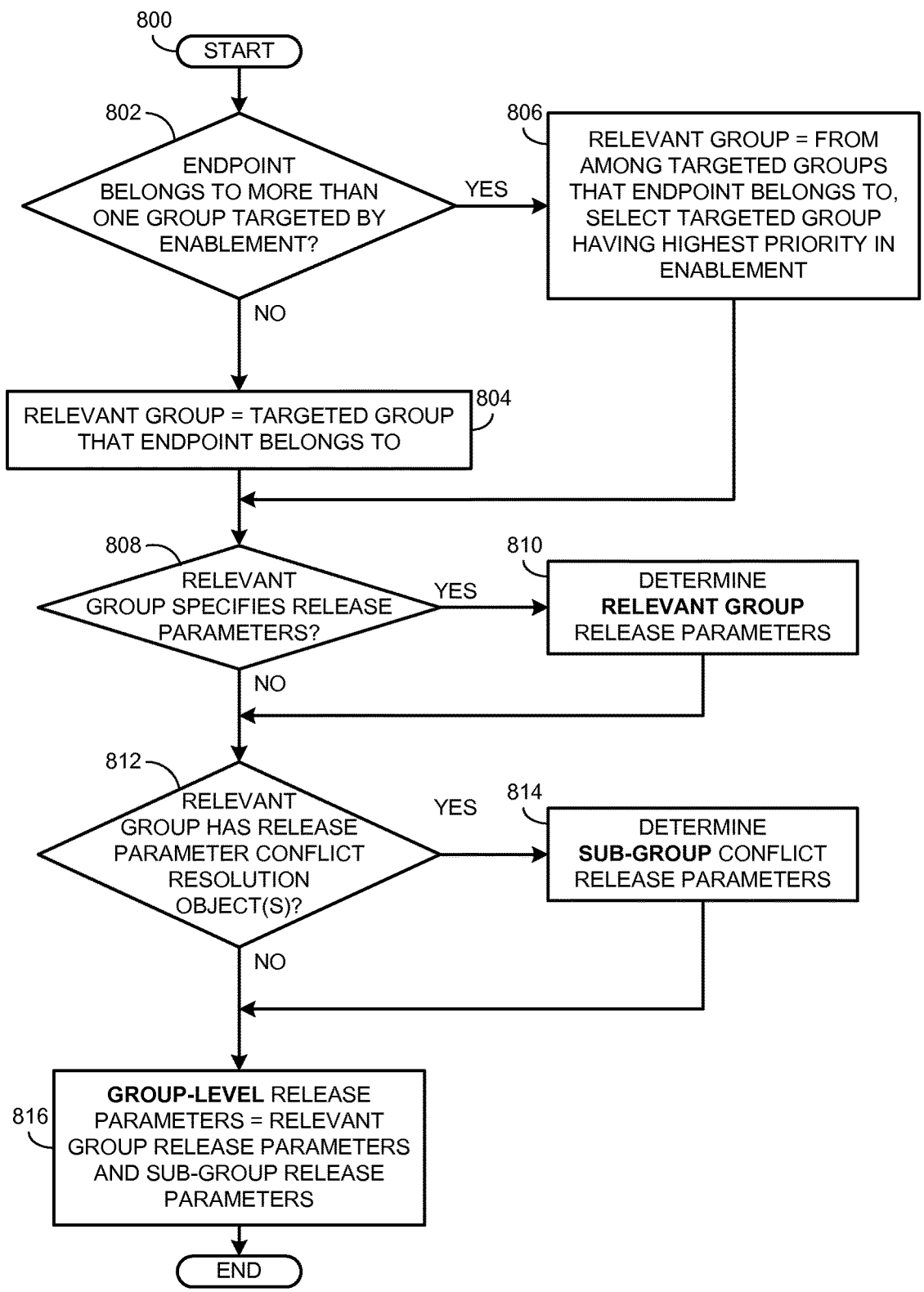
FIG. 8 is a flowchart illustration of an example method for collecting group-level release parameters; and Appendix A provides an example Query Grammar, defined as an ANTLR (Another Tool for Language Recognition) version 4 Grammar File.

If the release R does not specify any release parameters, as checked at 714, or once the release-level release parameters are added to the collection at 718, the method continues at 720 to determine group-level release parameters. FIG. 8 provides more details regarding how group-level release parameters are determined. At 722, group-level release parameters are added to the collection. Any group-level release parameter having a paramKey that is identical to the paramKey of an existing release parameter in the collection is ignored and is not added to the collection and is omitted from the collection of release parameters included in the message.

Once the group-level release parameters are added to the collection 722, the method continues with a check at 724 whether the domain specifies release parameters. If the domain specifies release parameters, as checked at 724, then domain-level release parameters are determined at 726. If any of the release parameters specified for the domain are multi-valued parameters, those release parameters are evaluated for the endpoint X, yielding paramKey-paramValue pairs that, together with simple paramKey-paramValue pairs specified for the domain, form the domain-level release parameters. The domain-level release parameters are added at 728 to the collection. Any domain-level release parameter having a paramKey that is identical to the paramKey of an existing release parameter in the collection is ignored and is not added to the collection and is omitted from the collection of release parameters included in the message.

If the domain does not specify any release parameters, as checked at 724, or once the domain-level release parameters are added to the collection at 728, the method continues at 730, where the entire collection of release parameters for the endpoint X is included in the message, and the method then ends.

In other words, and as described above in Table 4, endpoint-level release parameters trump deployment-level release parameters, which in turn trump release-level release parameters, which in turn trump group-level release parameters, which in turn trump domain-level release parameters.

FIG. 8 is a flowchart illustration of an example method for collecting group-level release parameters. The method of FIG. 8 starts at 800. It is checked at 802 whether the endpoint X belongs to more than one group targeted by the deployment D that deploys the release R. If the endpoint X belongs to only one group G targeted by the deployment D, then a relevant group is that targeted group, as determined at 804. If the endpoint X belongs to two or more groups, say G and H, that are targeted by the deployment D, then from among the groups that the endpoint X belongs to and that are targeted by the deployment D, the relevant group is the group with the highest priority in the deployment D, as determined at 806.

The method then continues with a check at 808 whether the relevant group specifies release parameters. If the relevant group specifies release parameters, as checked at 808, then relevant-group release parameters are determined at 810. If any of the release parameters specified for the relevant group are multi-valued parameters, those release parameters are evaluated for the endpoint X, yielding paramKey-paramValue pairs that, together with simple paramKey-paramValue pairs specified for the relevant group, form the relevant-group release parameters.

The method then continues with a check at 812 whether any release parameters are identified by paramKey in a conflict resolution object in the relevant group. For example, if the relevant group is a parent group of sub-groups, conflicts in release parameters specified in the underlying sub-groups may have been resolved by the use of conflict resolution objects that identify one of the sub-groups for a conflicting paramKey. All such release parameters are resolved, yielding paramKey-paramValue pairs where the parameter value is taken from the specification for the paramKey in the sub-group identified in the conflict resolution object. Those paramKey-paramValue pairs, together with the relevant-group release parameters, form the group-level release parameters. The method then ends.

The scope of the claims should not be limited by the details set forth in the examples, but should be given the broadest interpretation consistent with the description as a whole.

APPENDIX A

An example Query Grammar is defined as an ANTLR (Another Tool for Language Recognition) version 4 Grammar File.
// Define a grammar for the device service criteria string
grammar Criteria;
criteria : crit ;
crit : bool_term | crit OR bool_term ;
bool_term : bool_factor | bool_term AND bool_factor ;
bool_factor : bool_primary | NOT bool_primary ;
bool_primary : predicate | LPAREN criteria RPAREN ;
predicate : comparison_predicate | in_predicate | exists_predicate | missing_predicate | matches_predicate;
comparison_predicate : PROPERTY_ID comparison_op literal_value ;
in_predicate : PROPERTY_ID IN LPAREN value_list RPAREN;
exists_predicate : PROPERTY_ID EXISTS ;
missing_predicate : PROPERTY_ID MISSING ;
matches_predicate : PROPERTY_ID MATCHES LPAREN crit RPAREN ;
value_list : string_value_list | hex_value_list | dec_value_list | version_value_list;
string_value_list : STRING_LITERAL (LIST_SEP STRING_LITERAL)* ;
hex_value_list : HEX_LITERAL (LIST_SEP HEX_LITERAL)* ;
dec_value_list : DEC_LITERAL (LIST_SEP DEC_LITERAL)* ;
version_value_list : VERSION_LITERAL (LIST_SEP VERSION_LITERAL)* ;
comparison_op : EQUALS | NOT_EQUALS | LESS_THAN | GREATER_THAN | LESS_THAN_EQUAL | GREATER_THAN_EQUAL ;
literal_value : STRING_LITERAL | HEX_LITERAL | DEC_LITERAL | DATE_LITERAL | TIME_LITERAL | DATETIME_LITERAL | VERSION_LITERAL;
LPAREN : '(' ;
RPAREN : ')' ;
LIST_SEP : ',' ;
OR : 'OR' | 'or' ;

APPENDIX A-continued

AND : 'AND' | 'and' ;
NOT : 'NOT' | 'not' ;
EQUALS : '=' ;
NOT_EQUALS : '!=' ;
LESS_THAN : '<' ;
GREATER_THAN : '>' ;
LESS_THAN_EQUAL : '<=' ;
GREATER_THAN_EQUAL : '>=' ;
IN : 'IN' | 'in' ;
EXISTS : 'EXISTS' | 'exists' ;
MISSING : 'MISSING' | 'missing' ;
MATCHES : 'MATCHES' | 'matches' ;
STRING_LITERAL : '"' (ESC | ~['"\\])* '"' ;
fragment ESC : '\\' (['"\\/bfnrt] | UNICODE) ;
fragment UNICODE : 'u' HEX HEX HEX HEX ;
fragment HEX : [0-9a-fA-F] ;
HEX_LITERAL : '0x' (HEX)+ ;
DEC_LITERAL : '-'? INT_VAL ;
fragment INT_VAL : '0' | [1-9] [0-9]* ;
DATETIME_LITERAL : DATE_LITERAL 'T' TIME_LITERAL ;
DATE_LITERAL : [1-9][0-9][0-9][0-9] '-' MONTH_VAL '-' [0-3][0-9] (TIMEZONE_SPEC)?;
fragment MONTH_VAL : '0' [1-9] | '1' [0-2] ;
TIME_LITERAL : TIME_VAL TIMEZONE_SPEC | 'T:' TIME_VAL ;
fragment TIME_VAL : HOUR_VAL ':' MINUTE_VAL ':' SECOND_VAL | HOUR_VAL ':' MINUTE_VAL ;
fragment HOUR_VAL : [0-1] [0-9] | [2] [0-3] ;
fragment MINUTE_VAL : [0-5] [0-9] ;
fragment SECOND_VAL : [0-5] [0-9] ;
fragment TIMEZONE_SPEC : 'Z' | [+−] HOUR_VAL ':' ('00' | '30');
VERSION_LITERAL : 'v' INT_VAL ('.' INT_VAL)* ;
PROPERTY_ID : DOC_PROPERTY_ID ('.' DOC_PROPERTY_ID)* ;
fragment DOC_PROPERTY_ID : [a-zA-Z][a-zA-Z0-9_]* ;
WS : [ \t]+ -> skip ;

What is claimed is:

1. An endpoint management method comprising:
in a computing device:
storing data structures in an endpoint data store, each data structure representing an endpoint having one or more components, each component having one or more arbitrary properties, each component being an upgradeable entity that has at least one package installed or installable thereon;
defining multiple groups of endpoints, each group identified by its name and defined by its group criteria expressed in terms of the one or more arbitrary properties of the one or more components of the endpoints that are members of the group, wherein each arbitrary property is represented by a respective property tuple consisting of a key, a value, a source identifier, and a timestamp, wherein the source identifier identifies a source of the key and the value, and wherein the timestamp represents a time at which the property tuple was stored in the computing device;
for each group, storing in a group data store group data comprising the group criteria of the group in association with the name of the group; and
targeting a release of one or more packages to endpoints that belong to two or more of the multiple groups by defining a deployment for the release that identifies the two or more of the multiple groups by name and that assigns priorities to the identified two or more of the multiple groups; and
in an endpoint that belongs to the two or more of the multiple groups:
installing a particular package of the release on a component of the endpoint, and controlling functionality of the endpoint using the component on which the particular package is installed.

2. The endpoint management method as recited in claim 1, the method further comprising:
associating the release with a filter expressed in terms of the one or more arbitrary properties of the one or more components of the endpoints that are targeted.

3. The endpoint management method as recited in claim 1, wherein representations of the arbitrary properties within the data structures are aggregated from multiple sources.

4. The endpoint management method as recited in claim 1, wherein the group criteria of one of the multiple groups includes existence of a particular property.

5. The endpoint management method as recited in claim 1, wherein the group criteria of one of the multiple groups includes absence of a particular property.

6. The endpoint management method as recited in claim 1, wherein the group criteria of one of the multiple groups includes a comparison of a particular property to a value.

7. The endpoint management method as recited in claim 1, wherein the group criteria of one of the multiple groups includes endpoint membership in another group.

8. The endpoint management method as recited in claim 1, wherein any packages installed on the components are represented in the data structures.

9. An endpoint management system comprising:
a computing device operable to:
store data structures in an endpoint data store, each data structure representing an endpoint having one or more components, each component having one or more arbitrary properties, each component being an upgradeable entity that has at least one package installed or installable thereon;
define multiple groups of endpoints, each group identified by its name and defined by its group criteria expressed in terms of the one or more arbitrary properties of the one or more components of the endpoints that are members of the group, wherein each arbitrary property is represented by a respective property tuple consisting of a key, a value, a source identifier, and a timestamp, wherein the source identifier identifies a source of the key and the value, and wherein the timestamp represents a time at which the property tuple was stored in the computing device;
for each group, store in a group data store group data comprising the group criteria of the group in association with the name of the group; and
target a release of one or more packages to endpoints that belong to two or more of the multiple groups by defining a deployment for the release that identifies the two or more of the multiple groups by name and that assigns priorities to the identified two or more of the multiple groups; and
an endpoint that belongs to the two or more of the multiple groups, the endpoint operable to:
install a particular package of the release on a component of the endpoint, and
control functionality of the endpoint using the component on which the particular package is installed.

10. The endpoint management system as recited in claim 9, wherein the computing device is operable to:
associate the release with a filter expressed in terms of the one or more arbitrary properties of the one or more components of the endpoints that are targeted.

11. The endpoint management system as recited in claim 9, wherein representations of the arbitrary properties within the data structures are aggregated from multiple sources.

12. The endpoint management system as recited in claim 9, wherein the group criteria of one of the multiple groups includes existence of a particular property.

13. The endpoint management system as recited in claim 9, wherein the group criteria of one of the multiple groups includes absence of a particular property.

14. The endpoint management system as recited in claim 9, wherein the group criteria of one of the multiple groups includes a comparison of a particular property to a value.

15. The endpoint management system as recited in claim 9, wherein the group criteria of one of the multiple groups includes endpoint membership in another group.

16. The endpoint management system as recited in claim 9, wherein any packages installed on the components are represented in the data structures.

* * * * *